United States Patent [19]

Hosokawa et al.

[11] Patent Number: 5,497,237
[45] Date of Patent: Mar. 5, 1996

[54] METHOD OF CONVERTING A FIELD OF A REGENERATIVE SIGNAL A VTR AND APPARATUS EMPLOYING THE SAME

[75] Inventors: Kyoichi Hosokawa; Hitoaki Owashi; Kazuhiko Yoshizawa; Miyoko Yoshikoshi, all of Yokohama; Toshiaki Takahashi, Katsuta; Yasuo Inagaki, Katsuta; Koutaro Okiguchi, Katsuta, all of Japan

[73] Assignee: Hitachi, Ltd., Tokyo, Japan

[21] Appl. No.: 968,579

[22] Filed: Oct. 29, 1992

[30] Foreign Application Priority Data

Oct. 29, 1991 [JP] Japan ................................ 3-308230
Nov. 8, 1991 [JP] Japan ................................ 3-293276
Nov. 13, 1991 [JP] Japan ................................ 3-297020

[51] Int. Cl.⁶ .................................................... H04N 9/79
[52] U.S. Cl. .......................................... 358/310; 558/312
[58] Field of Search ........................................ 358/312, 313, 358/310, 335; 360/11.1, 10.1; 348/384, 390, 440, 441, 443

[56] References Cited

U.S. PATENT DOCUMENTS 5,043,811  8/1991  Yasuhito ................................ 358/140
5,243,422  9/1993  Owashi et al. ........................ 358/140

*Primary Examiner*—Howard W. Britton
*Assistant Examiner*—Robert Chevalier
*Attorney, Agent, or Firm*—Antonelli, Terry, Stout & Kraus

[57] ABSTRACT

A method of converting a field of a regenerative signal in a VTR is provided wherein when image is reproduced at a nonstandard play speed, field data of a predetermined field number is formed using an inter-field signal with respect to a still part, and field data of a predetermined number is formed using only an inter-line signal with respect to a moving part; with respect to a carrier chrominance signal of a different field which will be interlaced, a signal processing is performed in such a way that when composite video signals are inputted in a normal direction, a phase is inverted, while when the composite video signals are inputted in a reverse direction, the phase is not inverted; and when abnormality occurs in an input state of the composite video signals, field data of a predetermined field number is formed using only the inter-line signal.

6 Claims, 21 Drawing Sheets

FIG. 3A
FIG. 3B
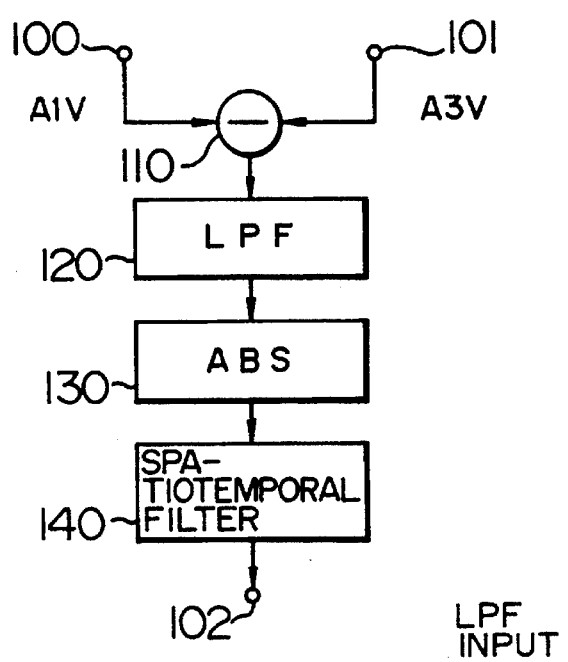
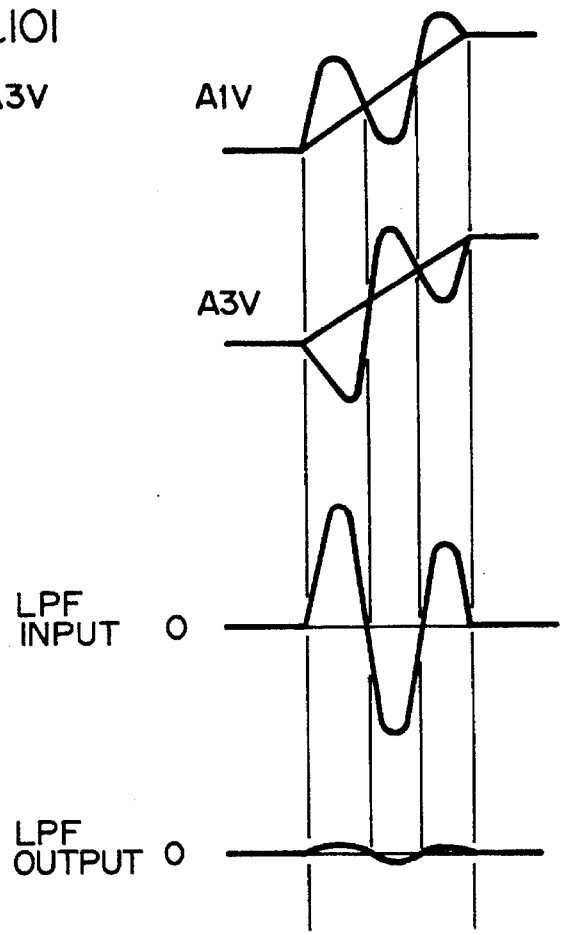

FIG. 16

| | | | PLAYBACK OF 0–1 PLAYBACK SPEED | | | | | | | | |
|---|---|---|---|---|---|---|---|---|---|---|---|
| | No. | | 1 | 2 | 3 | 4 | 5 | 6 | 7 | 8 | 9 |
| REGENERATIVE VIDEO SIGNAL | | V0 | #1 | #2 | #3 | #3 | #3 | #4 | #1 | #2 | #3 |
| INPUTS OF SELECTION CIRCUIT 19 | OUTPUTS OF FIELD MEMORIES | V1 | #4 | #1 | #2 | #3 | #3 | #3 | #4 | #1 | #2 |
| | | V2 | #3 | #4 | #1 | #2 | #2 | #2 | #3 | #4 | #1 |
| | | V3 | #2 | #3 | #4 | #1 | #1 | #1 | #2 | #3 | #4 |
| | | V4 | #1 | #2 | #3 | #4 | #4 | #4 | #1 | #2 | #3 |
| | | V5 | #4 | #1 | #2 | #3 | #3 | #3 | #4 | #1 | #2 |
| OUTPUTS OF SELECTION CIRCUIT 19 | MOTION DETECTION INPUT TERMINALS | 342 | V2 | V2 | V2 | V3 | V3 | V2 | V2 | V2 | V2 |
| | | 343 | V4 | V4 | V4 | V5 | V5 | V4 | V4 | V4 | V4 |
| | Y/C SEPARATION INPUT TERMINALS | 502 | V2 | V2 | V2 | V3 | V3 | V2 | V2 | V2 | V2 |
| | | 503 | V1 | V1 | V1 | V2 | V2 | V1 | V1 | V1 | V1 |
| | | 504 | V3 | V3 | V3 | V4 | V4 | V3 | V3 | V3 | V3 |

FIG. 17

| | | | 1 | 2 | 3 | 4 | 5 ▽ABNORMAL | 6 | 7 | 8 | 9 |
|---|---|---|---|---|---|---|---|---|---|---|---|
| No. | | | | | | | | | | | |
| REGENERATIVE VIDEO SIGNAL | | V0 | #1 | #2 | #3 | #4 | #3 | #4 | #1 | #2 | #3 |
| INPUTS OF SELECTION CIRCUIT 19 | OUTPUTS OF FIELD MEMORIES | V1 | #4 | #1 | #2 | #3 | #4 | #3 | #4 | #1 | #2 |
| | | V2 | #3 | #4 | #1 | #2 | #3 | #4 | #3 | #4 | #1 |
| | | V3 | #2 | #3 | #4 | #1 | #2 | #3 | #4 | #3 | #4 |
| | | V4 | #1 | #2 | #3 | #4 | #1 | #2 | #3 | #4 | #3 |
| | | V5 | #4 | #1 | #2 | #3 | #4 | #1 | #2 | #3 | #4 |
| OUTPUT OF SELECTION CIRCUIT 19 | MOTION DETECTION INPUT TERMINALS | 342 | V2 | V2 | V2 | V2 | V2 | V2 | V2 | V2 | V2 |
| | | 343 | V4 | V4 | V4 | V4 | V4 | V4 | V4 | V4 | V4 |
| | Y/C SEPARATION INPUT TERMINALS | 502 | V2 | V2 | V2 | V2 | V2 | V2 | V2 | V2 | V2 |
| | | 503 | V1 | V1 | V1 | V1 | V1 | V1 | V1 | V1 | V1 |
| | | 504 | V3 | V3 | V3 | V3 | V3 | V3 | V3 | V3 | V3 |

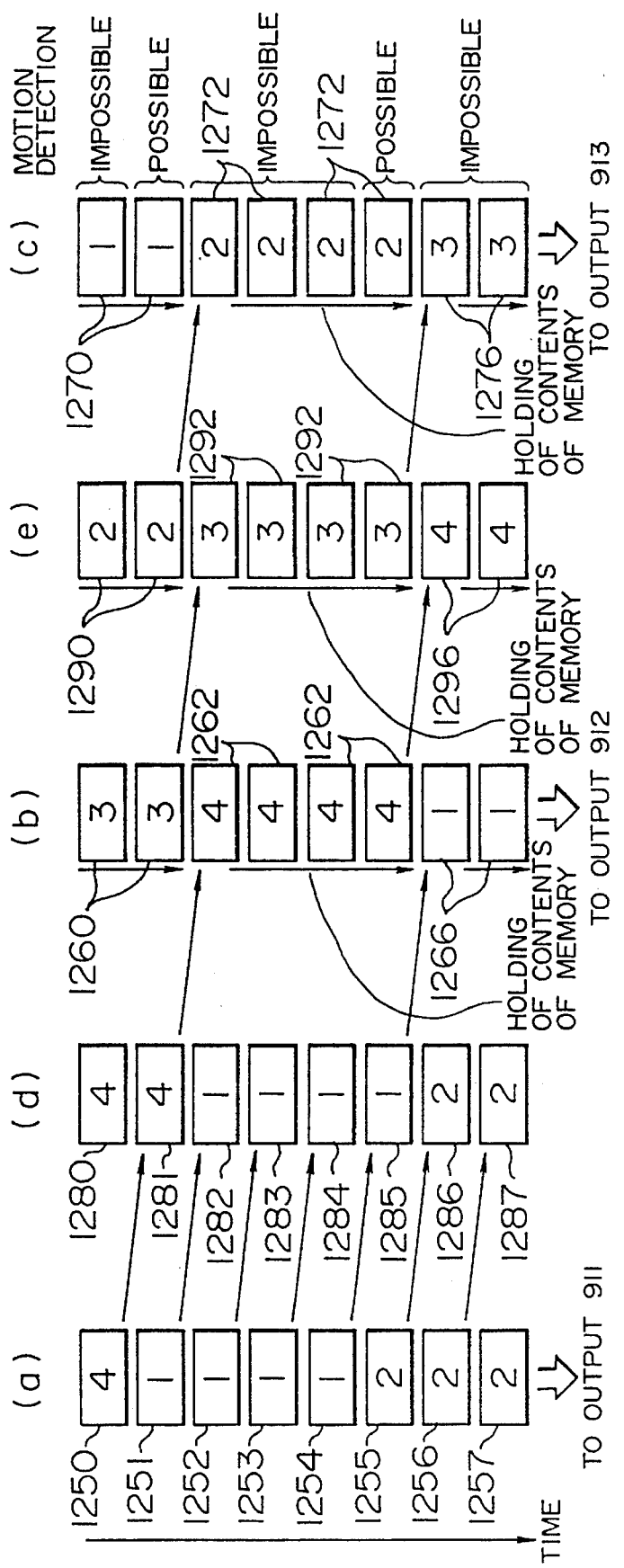

METHOD OF CONVERTING A FIELD OF A REGENERATIVE SIGNAL A VTR AND APPARATUS EMPLOYING THE SAME

BACKGROUND OF THE INVENTION

The present invention relates to a field conversion method of producing field data having a new field number from field data having an arbitrary field number during nonstandard speed play of a freeze picture (still picture) or the like by a magnetic video recording and reproducing apparatus (hereinafter referred to as "VTR" for short, when applicable) or the like, and an apparatus employing the same.

When a video signal recorded by VTR or the like is reproduced, for the adjustment of a regenerative time, or slow playback, fast playback, freeze picture playback or the like for providing a special effect, a picture may be suitably thinned out or the same picture may be repeatedly displayed in some cases. At this time, a video signal of which a field number is different from that of a regenerative video signal needs to be produced so as to fulfill the interlace conditions of the video signal and the conditions of continuity of the color subcarrier, i.e., in order to maintain continuity of four field numbers of a four-field sequence in the case of the NTSC television signal. In order to attain the production of that video signal, the degradation of the vertical resolution of an image during the special playback is often reduced using the technology of an interpolation filter. Examples of such an interpolation filter unit are shown in (1) JP-A-2-132984 and (2) U.S. Pat. No. 4,641,202.

Moreover, the processing technology in the case where the above processing is performed by a digital VTR is shown in (3) "Reproduced Video Signal Processing for Composite Digital VTR", ITEJ Technical Report, Vol. 14, No. 47, pp. 13–18.

Further, one example of a motion detection circuit of a field conversion circuit for processing a video signal between the fields to perform the interpolation is shown in (4) JP-A-3-13790.

As shown in the above articles (1), (2) and (3), in those systems, the vertical movement of the picture image occurs along with the field conversion. The vertical movement of the picture image produces a visual anxiety feeling and degrades remarkably the picture quality. In the case where the freeze picture is outputted, only the signals of one field are used. Therefore, there arises a problem in that the vertical resolution is degraded and as a result the edge of the picture image corrugates.

Moreover, in the above-mentioned prior art, there is a possibility that the regenerative signal skips and the above-mentioned motion detection circuit and the field conversion circuit fall into malfunction because the migration period up to the servo locking and the state in the abnormality of the servo in the VTR is not taken into consideration at all.

SUMMARY OF THE INVENTION

It is therefore an object of the present invention to provide a method of controlling a signal processing and an apparatus employing the same which are capable of improving picture quality in the nonstandard speed play by overcoming the vertical movement of a picture image following the signal processing in the above nonstandard speed play and the degradation of the vertical resolution of a freeze image.

It is another object of the present invention to provide a field conversion method and an apparatus employing the same which are capable of providing good field conversion operation even in the abnormal playback operation in which the playback mode switching of the VTR and the field being reproduced skip suddenly.

In order to attain the above objects, according to the present invention, each of composite video signals which have been inputted in sequence is separated into a luminance signal (Y) and a carrier chrominance signal (C). Moreover, the composite video signals which have been inputted are delayed by a delay circuit with a tap. Each composite video signal, which has been delayed by a period corresponding to one field delay and will be interlaced with the composite signal sent to the delay circuit with a tap, is also separated into the luminance signal and the carrier chrominance signal. By using the signals of plural scanning lines of the present field which has been obtained and those of plural scanning lines of a field which is different from that field and will be interlaced therewith, line-interpolation is performed with respect to the luminance signal and the carrier chrominance signal. Since for the carrier chrominance signal, the phase of the normal rotation direction is an inverted version of that of the reverse rotation direction, the line-interpolation is performed while performing the inversion control of the phase by the normal rotation and the reverse rotation, with respect to the phases of the signals of the different fields. That is, the phase of the carrier chrominance signal is inverted between the lines. Therefore, in the case where the signal is inputted in the normal rotation direction, the phase of the signal of the different field which is interlaced is an inverted version of that of the signal which is being inputted at present. In this case, the phase of the signal of the different field is inverted by the phase inversion control circuit so that the line-interpolation signal processing, which is similar to that of the luminance signal, can be performed.

In the case where the signal is sent in the reverse rotation direction, the phase of the signal of the different field which will be interlaced coincides with that of the signal being sent at present. In this case, the line-interpolation signal processing similar to that of the luminance signal can be performed without inverting the phase by the phase inversion control circuit.

In the case where the composite video signal which has been inputted in the normal rotation direction is frozen, the phase of the carrier chrominance signal of the different field is inverted to perform the signal processing, whereby an inter-field signal processing can be performed and the freeze picture of high picture quality can be obtained.

In the case where the composite video signal which has been inputted in the reverse rotation direction is frozen, the signal processing is performed without inverting the phase of the carrier chrominance signal of the different field, whereby the inter-field signal processing can be performed. Thus, in any case, it is possible to obtain the freeze picture of high picture quality with small degradation of the vertical resolution.

By adding the luminance signal and the chrominance signal which have been subjected to the respective signal processings to each other, an afterimage, the corrugated parts of the edge and the degradation of the vertical resolution can be also reduced. Thus, it is possible to realize the field conversion which maintains the continuity of the color subcarrier.

In the present invention, in the still part such as a background, the line-interpolation is performed using the inter-field signals, i.e., the signals of the different field which will be interlaced with the present field, in addition to the signals within the field which is being sent at present.

Therefore, the shift of the center of gravity following the line-interpolation does not occur. Moreover, in the moving part, the line-interpolation is performed using the inter-line signals, i.e., the signals of the plural scanning lines within the field being inputted at present. Therefore, the afterimage does not occur.

Further, the motion is detected by the motion detection circuit, and in correspondence to the motion, the inter-line signal processing and the inter-field signal processing is added to each other with the mixture ratio thereof being changed. Therefore, smooth switching can be performed between the moving part and the still part, and as a result, it is possible to provide natural picture quality.

Moreover, in the case where the field is repeated by the nonstandard speed play, the signal of the field repeated is stopped being written to the delay circuit with a tap. Then, the signal processing is performed using both the repeated signal and the signal which has already been stored in the delay circuit with a tap.

Moreover, in order to perform the good field conversion operation in the abnormal playback operation as well, a protection circuit which detects the abnormal state of the VTR to generate a gate signal for a predetermined period, and a gate circuit which passes therethrough the motion signal for a period other than that of the gate signal to output a motion signal having a predetermined value for the period of the gate signal to supply the motion signal thus outputted to a field conversion circuit. Moreover, the motion detection circuit is also controlled by the gate signal.

When the protection circuit does not detect the normal state of the VTR, the field conversion circuit performs the processing operation corresponding to the motion signal sent from the motion detection circuit, so that the regenerative video signal of the VTR is converted into a video signal of a field having a desired field number by the field conversion circuit.

When the protection circuit detects the abnormal state of the VTR in which the playback state gets abnormal, the gate circuit outputs the motion signal having the predetermined value, and the field conversion circuit operates in such a way that the regenerative video signal is produced by the inter-line signal processing using only the corresponding field data. As a result, the influence by the abnormal operation of the VTR is removed.

Moreover, by receiving the gate signal, the motion detection circuit reaches the state of outputting the motion signal when the VTR is in a predetermined playback state. As a result, when the gate signal ends, the normal motion signal can be immediately outputted.

When the playback is returned to the normal state, after the necessary signals are stored in field memories, the field conversion circuit is controlled in such a way as to perform the inter-field signal processing as well as the inter-line signal processing.

Therefore, according to the present invention, the field conversion can be performed even in the servo abnormality of the VTR, the unlocked state of the servo in the switching of the playback mode, and the like each of which becomes a problem when the field conversion circuit including the inter-field signal processing is applied to the VTR, without malfunction.

BRIEF DESCRIPTION OF THE DRAWINGS

FIG. 3A is a block diagram showing a configuration of one example of a motion detection circuit relating to the present invention;

FIG. 3B is a waveform chart for the circuit shown in FIG. 3A;

FIG. 16 is a diagram useful in explaining the operation in the normal state of a selection circuit in the embodiment of FIG. 10;

FIG. 17 is a diagram useful in explaining the operation in the abnormal playback state of the selection circuit shown in FIG. 10;

FIGS. 22A and 22B are block diagrams each showing a detailed structure of a memory delay line of FIG. 21.

DESCRIPTION OF THE PREFERRED EMBODIMENTS

Figure 1:
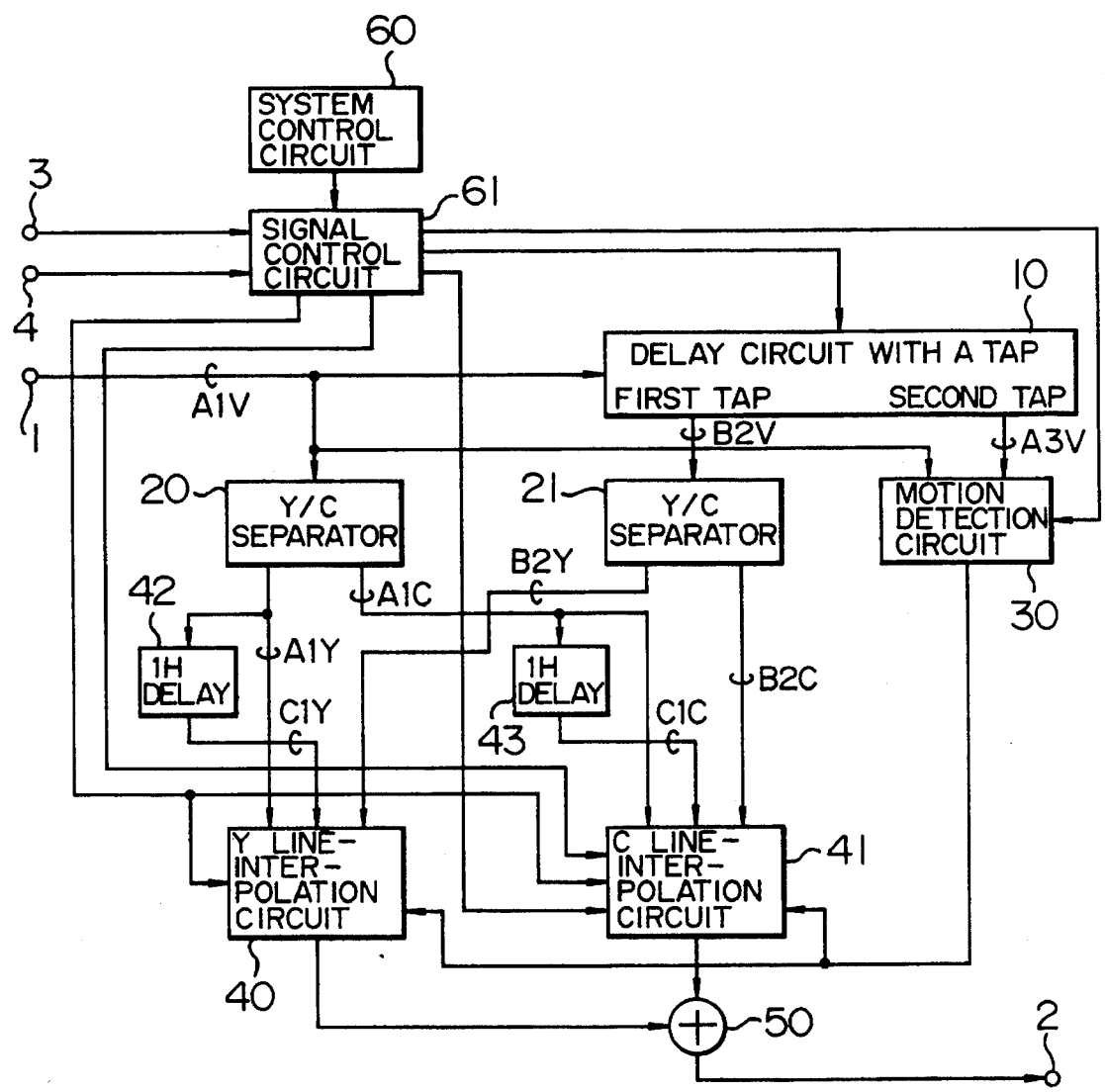
FIG. 1 is a block diagram showing a configuration of one embodiment of the present invention.
Figure 2A:
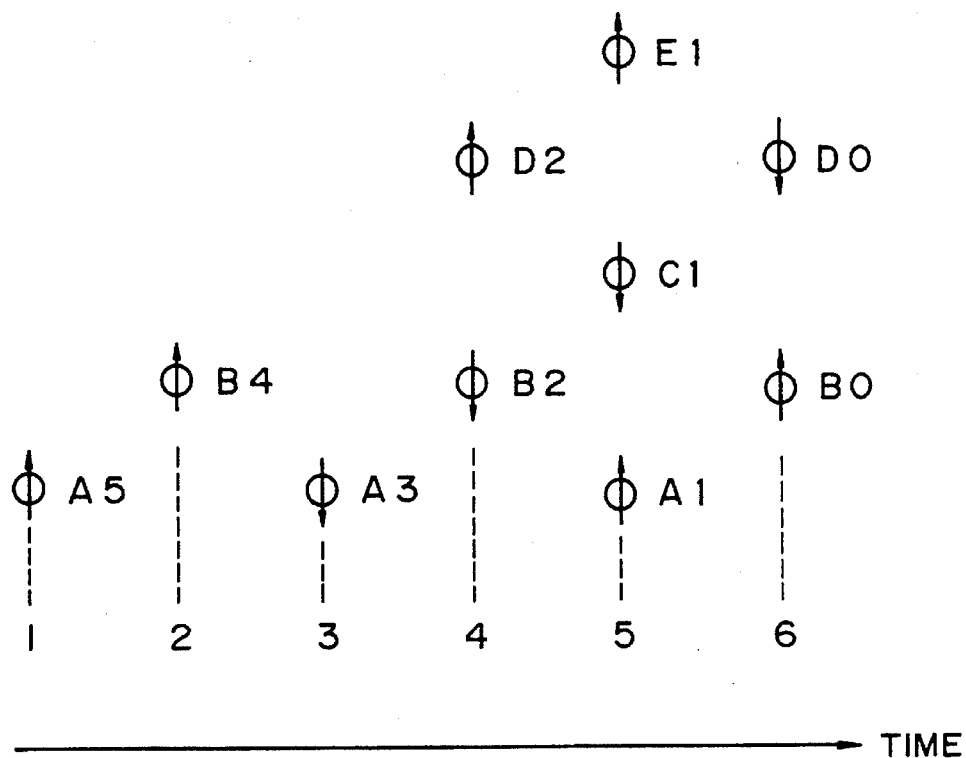
FIGS. 2A and 2B are respectively diagrams useful in explaining a regenerative video signal.
Figure 2B:
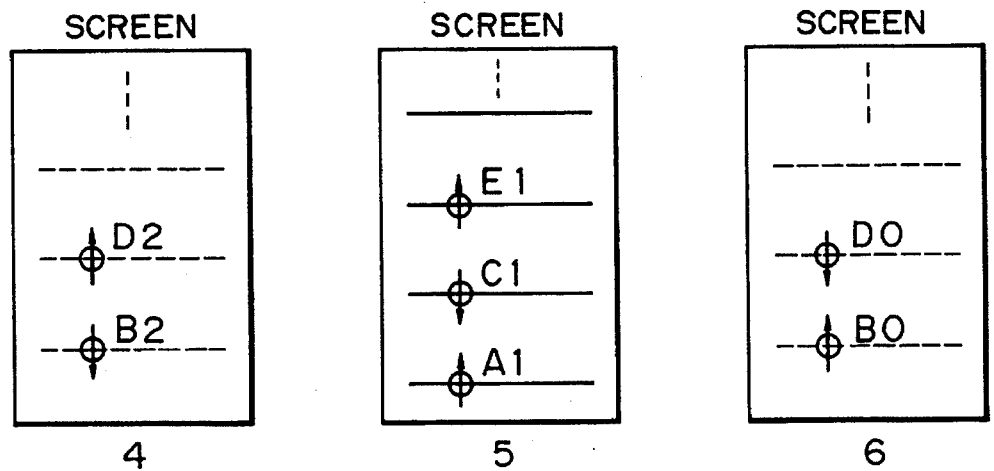

FIG. 1 is a block diagram showing a configuration of one embodiment of a field conversion circuit of the present invention. FIGS. 2A and 2B are respectively views useful in explaining the operation of the circuit shown in FIG. 1 and showing positions of scanning lines of signals of respective parts. In FIG. 2A, the axis of abscissa represents the time, and the fields are plotted on the axis of abscissa in order and reproduced in the order of numerical characters shown in a lower portion. Moreover, in FIG. 2A, the reference symbols A, B, C, . . . represent respective positions of scanning lines, and the suffixes represent the order of the fields. When a composite video signal, a luminance signal, a carrier chrominance signal, and the like are represented with the positions of the signals A1, B2, . . . , the numeral symbols V, Y, C and the like are added thereto. Moreover, each arrow represents a phase of a color subcarrier in the case where the regenerative signal is a television signal of the NTSC system. FIG. 2B shows the positional relationship on a screen.

In FIG. 1, the reference numeral 1 designates an input terminal for the composite video signal; the reference numeral 2 designates an output terminal for the composite video signal after the field conversion; the reference numeral 3 designates an input terminal for a signal representing the field number of a regenerative video signal; the reference numeral 4 designates an input terminal for a signal representing the field number of an output video signal after the signal processing; the reference numeral 10 designates a delay circuit with a tap which delays a signal in fields; the reference numerals 20 and 21, Y/C separators each of which separates the composite video signal into a luminance signal and a carrier chrominance signal; the reference numeral 30, a motion detection circuit; the reference numeral 40, a Y line-interpolation circuit which subjects the luminance signal into the line-interpolation processing; the reference numeral 41, a C line-interpolation circuit which subjects the carrierr chrominance signal into the line-interpolation processing; 42 and 43, delay circuits each of which delays a signal by one horizontal scanning period; 50, an adder; 60, a system control circuit which outputs a signal for controlling the system; and 61, a signal control circuit which controls the time delay of the delay circuit with a tap 10 and the signal processings of the Y line-interpolation circuit 40 and the C line-interpolation circuit 41.

In FIG. 2A, it is assumed that the composite video signal which is being inputted at present through the terminal 1 is A1V. The composite video signal A1V which has been inputted through the terminal 1 is inputted to the Y/C separator 20 to be separated into a luminance signal A1Y and a carrier chrominance signal A1C. The luminance signal A1Y which has been obtained by the separation in the Y/C separator 20 is inputted to both the Y line-interpolation circuit 40 and the delay circuit 42. In the delay circuit 42, the luminance signal A1Y inputted thereto is delayed by one horizontal scanning period to be inputted to the Y line-interpolation circuit 40. The carrier chrominance signal A1C which has been obtained by the separation in the Y/C separator 20 is similarly inputted to both the C line-interpolation circuit 41 and the delay circuit 43. In the delay circuit 43, the carrier chrominance signal A1C inputted thereto is delayed by one horizontal scanning period to be inputted to the C line-interpolation circuit 41.

Moreover, the composite video signal A1V which has been inputted through the terminal 1 is inputted to the delay circuit with a tap 10 and then a composite video signal B2V which is delayed by one field and interlaced with the composite video signal A1V is outputted from a first tap of the delay circuit with a tap 10.

The composite video signal B2V which has been outputted from the first tap of the delay circuit with a tap 10 is inputted to the Y/C separator 21 to be separated into a luminance signal B2Y and a carrier chrominance signal B2C to be outputted therefrom. The luminance signal B2Y which has been obtained by the separation is inputted to the Y line-interpolation circuit 40 while the carrier chrominance signal B2C obtained by the separation is inputted to the C line-interpolation circuit 41.

Moreover, to the motion detection circuit 30 are inputted the composite video signal A1V inputted through the terminal 1 and a signal from a second tap of the delay circuit with a tap 10. From the second tap of the delay circuit with a tap 10, a video signal A3V which is delayed by two fields with respect to the input video signal A1V is outputted.

FIG. 3A is a block diagram showing a configuration of one example of the motion detection circuit. In FIG. 3A, the reference numeral 100 designates a terminal through which the composite video signal A1V of the present field is inputted; the reference numeral 101 designates an input terminal for the video signal A3V, which is delayed by two fields with respect to the present video signal A1V and outputted from the second tap of the delay circuit with a tap 10; the reference numeral 102 designates an output terminal for a motion signal; the reference numeral 110, a subtracter; the reference numeral 120, a low pass filter; the reference numeral 130, an absolute circuit which calculates an absolute value of the signal; and 140, a spatiotemporal filter which enlarges spatiotemporally the signal which has been obtained in the absolute circuit 130.

FIG. 3B is a waveform chart showing a state in which the signals A1V and A3V in each of which the carrier chrominance signal of high frequency is superposed on the luminance signal of low frequency are processed in the circuit of FIG. 3A.

The signals A1V and A3V which have been inputted through the terminals 100 and 101, respectively, and in which there is a time difference of one frame (=two fields) are inputted to the subtracter 110. As shown in FIG. 2A, since the signals A1V and A3V are signals of the scanning line of the same position, if no motion occurs, the difference between their luminance signals become zero. In the case of the television signal of the NTSC system, since the phase of the color subcarrier is inverted between the fields, even if the difference between those signals is calculated, the amplitude of the carrier chrominance signal will be doubled as shown in FIG. 3B. Therefore, the motion of the carrier chrominance signal cannot be detected. Accordingly, the output of the subtracter 110 is inputted to the low pass filter 120 to remove the component of the carrier chrominance signal. Thus, the motion of the luminance signal can be detected. The absolute value of the signal corresponding to the motion outputted from the low pass filter 120 is obtained by the absolute circuit 130. The output signal of the absolute circuiit 130 is inputted to the spatiotemporal filter circuit 140 to enlarge the region of the motion signal spatiotemporally. This signal is designated a motion signal of the input video signal. The spatiotemporal filter 140 is used to reduce the omission of detection of the motion and relieve the sense of incompatibility of the partial motion due to the noises and the like.

In the embodiment shown in FIG. 3A, the signals having a time difference of one frame are inputted. However, if the signals having a time difference of two frames are inputted, the motion of the carrier chromonance signal can be also detected. In this case, the low pass filter 120 will be unnecessary. In this case, a signal which is delayed by two frames with respect to the input video signal A1V may be inputted from the second tap of the delay circuit with a tap 10.

The motion signal which has been outputted from the motion detection circuit 30 is inputted to both the Y line-interpolation circuit 40 and the C line-interpolation circuit 41. When the motion is detected, the motion signal is subjected to the line-interpolation using the signal of the present field. When no motion is judged, the line-interpolation is performed using the signal of the field, which will be interlaced with the present field, in addition to the signal of the present field.

The signals which have been obtained through the line-interpolation in the Y line-interpolation circuit 40 and the C line-interpolation circuit 41 are inputted to the adder 50 which adds both the signals to each other to output the resultant signal as a signal after the line-interpolation through the terminal 2.

Figure 4:
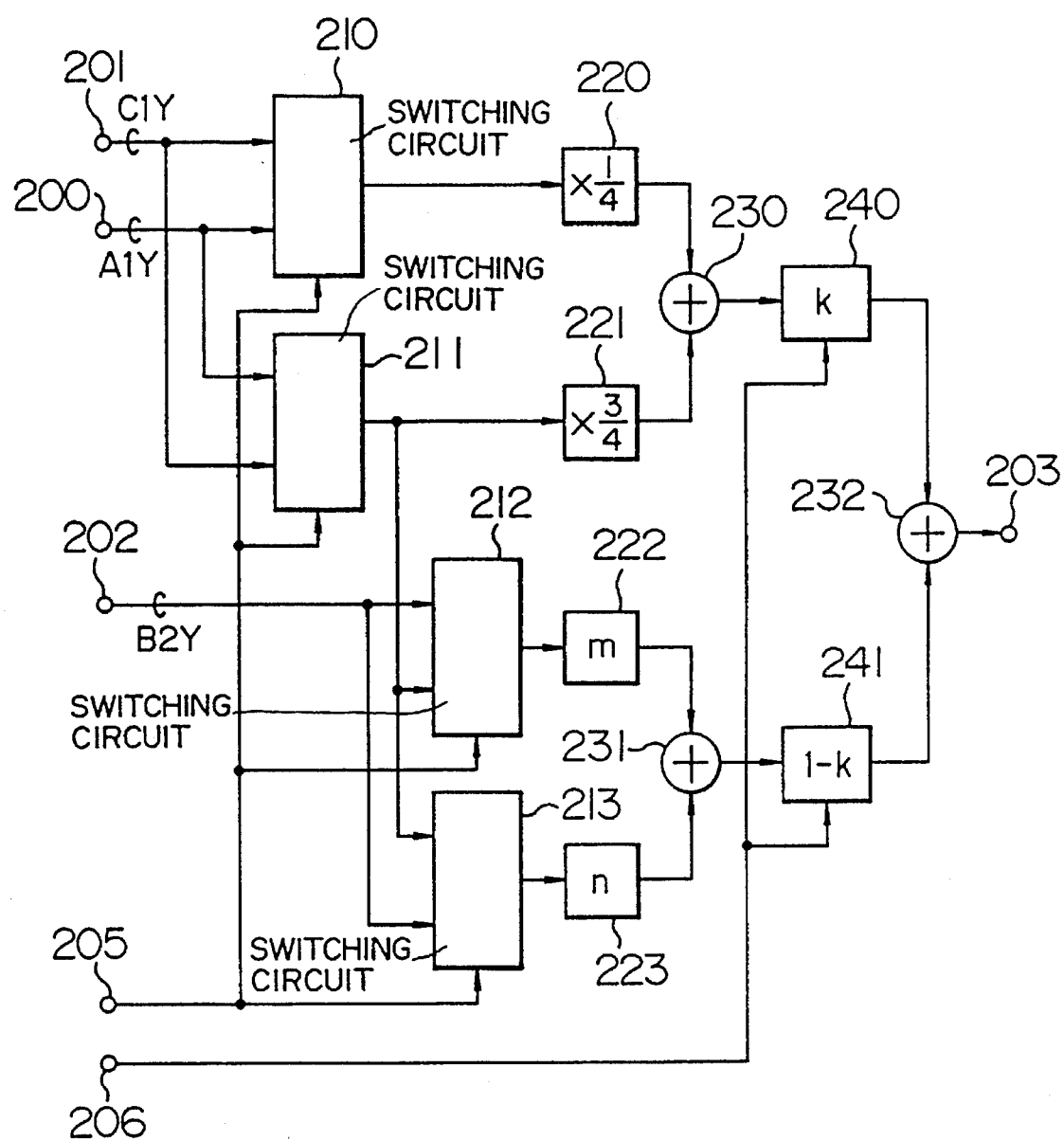
FIG. 4 is a block diagram showing a configuration of one embodiment of a Y line-interpolation circuit of the present invention.

FIG. 4 is a block diagram showing a configuration of one embodiment of the Y line-interpolation circuit 40. In FIG. 4, the reference numeral 200 designates an input terminal for the signal A1Y on the line which is being reproduced at present; the reference numeral 201 designates an input terminal for the signal C1Y which is delayed by one horizontal scanning period; the reference numeral 202 designates an input terminal for the signal B2Y which will be interlaced with those signals; the reference numeral 203 designates an output terminal for the signal after the line-interpolation processing; the reference numeral 205 designates an input terminal for the line-interpolation control signal sent from the signal control circuit 61; the reference numeral 206, an input terminal for the motion signal from the motion detection circuit 30; 210 to 213, switching circuits; 220 to 223, coefficient circuits; 230 to 232, adders; and 240 and 241, coefficient circuits of which coefficients change depending on the motion signal.

To the signal control circuit 61 shown in FIG. 1 are inputted the signal through the terminal 3 which represents the field number of the signal being reproduced at present and the signal through the terminal 4 which represents the output field number of the signal.

For example, in the slow playback, the numbers are inputted from the terminal 3 in the order of 1, 1, 2, 2, 3, 3, . . . and the numbers are inputted through the terminal 4 in the order of 1, 2, 3, 4, 1, 2, 3, 4, . . . since the four fields are repeated in the NTSC system. On the basis of those field numbers, a signal is outputted which is used for controlling whether the signal of interest should be converted into a signal of the scanning line of the same position or a signal of the scanning line of the different position. This line-interpolation control signal is inputted through the terminal 205 of FIG. 4. First, the description will be given to the operation of the signal processing in the case where the signal of interset is converted into a signal of the scanning line of the same position.

The signal of the present field which has been inputted through the terminal 200 is inputted to both the switching circuits 210 and 211. Moreover, the signal C1Y which has been inputted through the terminal 201 from the delay circuit 42 is also inputted to both the switching circuits 210 and 211. In the case where the signal of interest is converted into a signal of the same scanning line in correspondence to the line-interpolation control signal inputted through the terminal 205, the signal C1Y is selected in the switching circuit 210, and the signal A1Y is selected in the switching circuit 211. The output signal C1Y of the switching circuiit 210 is inputted to the coefficient circuit 220 to be increased by ¼ times. The output signal A1Y of the switching circiit 211 is inputted to the coefficient circiit 221 to be increased by ¾ times. The output signals of the coefficient circuits 220 and 221 are inputted to the adder 230 to be added to each other. A signal corresponding to a position which has been obtained by dividing a line segment between a position A1 and a position C1 internally in a ratio of 1:3 is outputted from the adder 230. That is, the signal which is obtained through the line-interpolation using data of an inter-line is outputted.

The output signal of the switching circuit 211 is inputted to both the switching circuits 212 and 213. Moreover, the signal B2Y which will be interlaced with the present signal A1Y is inputted through the terminal 202 to both the switching circuits 212 and 213. In the case where the signal of interest is converted into a signal of the same scanning line in correspondence to the line-interpolation control signal inputted through the terminal 205, the signal B2Y is selected in the switching circuit 212, and the signal from the switching circuit 211, i.e., the signal A1Y is selected in the switching circuiit 213. The output signal B2Y of the switching circuit 212 is inputted to the coefficient circuit 222 to be increased by m times. The output signal A1Y of the switching circuit 213 is inputted to the coefficient circuit 223 to be increased by n times. The coefficients m and n of the coefficient circuits 222 and 223 are set so as to fulfill the relationship of m+n=1. The output signals of the coefficient circuiits 222 and 223 are inputted to the adder 231 to be added to each other. A signal corresponding to a position which has been obtained by dividing a line segment between the position A1 and a position B2 internally in a ratio of m:n is outputted from the adder 231. As a result, the signal which is obtained through the line-interpolation using data of an inter-field is outputted. For example, if m is set to ¼ and n is set to ¾, the signal of interest is converted into a signal corresponding to a position which is obtained by dividing the line segment between the position A1 and the position B2 internally in a ratio of 1:3. If both of m and n are set to 0.5, the signal of interest is converted into a signal corresponding to a position which is obtained by dividing the line segment between the position A1 and the position B2 internally in a ratio of 1:1. Thus, the signal which is subjected to the line-interpolation using data of an inter-line, which corresponds to data of position between the positions A1 and C1 internally divided in a ratio of 1:3 can be made to coincide with the center of gravity of the picture image. However, when both of m and n are set to 0.5, since in the picture image in which the signal level changes depending on the field, the signal levels are averaged, the time resolution is degraded. When the time resolution is regarded as important as compared with the center of gravity of the picture image by the moving image signal processing and that by the still image signal processing, m may be set to a small value and n may be set to a large value. For example, when m is set to 0 and n is set to 1, since the scanning line data is directly outputted without calculation, the degradation of the time resolution is prevented. A method of controlling the line-interpolation is shown in Table 1. In Table 1, ¼ represents the conversion of the signal of interest into a signal of the scanning line of the same position, and ¾ represents the conversion of the signal of interest into a signal of the scanning line of the different position.

The motion signal which has been outputted from the motion detection circuit 30 of FIG. 1 is inputted through the terminal 206 to control the coefficients of the coefficient circuits 240 and 241. When the large motion occurs, the coefficient k of each of the coefficient circuits 240 and 241 is set to 1. When no motion occurs, the coefficient k is set to 0. In the mean time, when the small motion occurs, the coefficient k takes a value of 0 to 1.

The output signal of the adder 230 is increased by k times in the coefficient circuit 240, the output signal of the adder 231 is increased by (1−k) times in the coefficient circuit 241, and the resultant signals are inputted to the adder 232 to be added to each other to be outputted therefrom. That is, the result of the inter-line signal processing and the result of the inter-field signal processing are added to each other to be outputted in correspondence to the degree of the motion. The terminal 203 is an output terminal therefor.

In the case where the signal of interest is converted into a signal of the scanning line of the different position, the signals opposite to the above signals are selected in the switching circuits 210 to 213. In this case, the output of the circuit for performing line-interpolation using an inter-line processing which has been outputted from the adder 230 is converted into a signal corresponding to a position which is obtained by dividing a line segment between the position A1 and a position C1 internally in a ratio of 3:1. The output of the circuit for performing line-interpolation using an inter-field signal processing which has been outputted from the adder 231 is converted into a signal corresponding to a position which is obtained by dividing the line segment between the position A1 and the position B2 internally in a ratio of n:m.

As described above, in the circuit for performing line-interpolation using an inter-field processing which is used for the still part, in both the case of the conversion of the signal of interest into a signal of the scanning line of the same position and the case of the conversion of the signal of interest into a signal of the scanning line of the different position, the line-interpolation is performed using the data of the two fields interlaced with each other. Therefore, no vertical movement of the picture image occurs.

Figure 5:
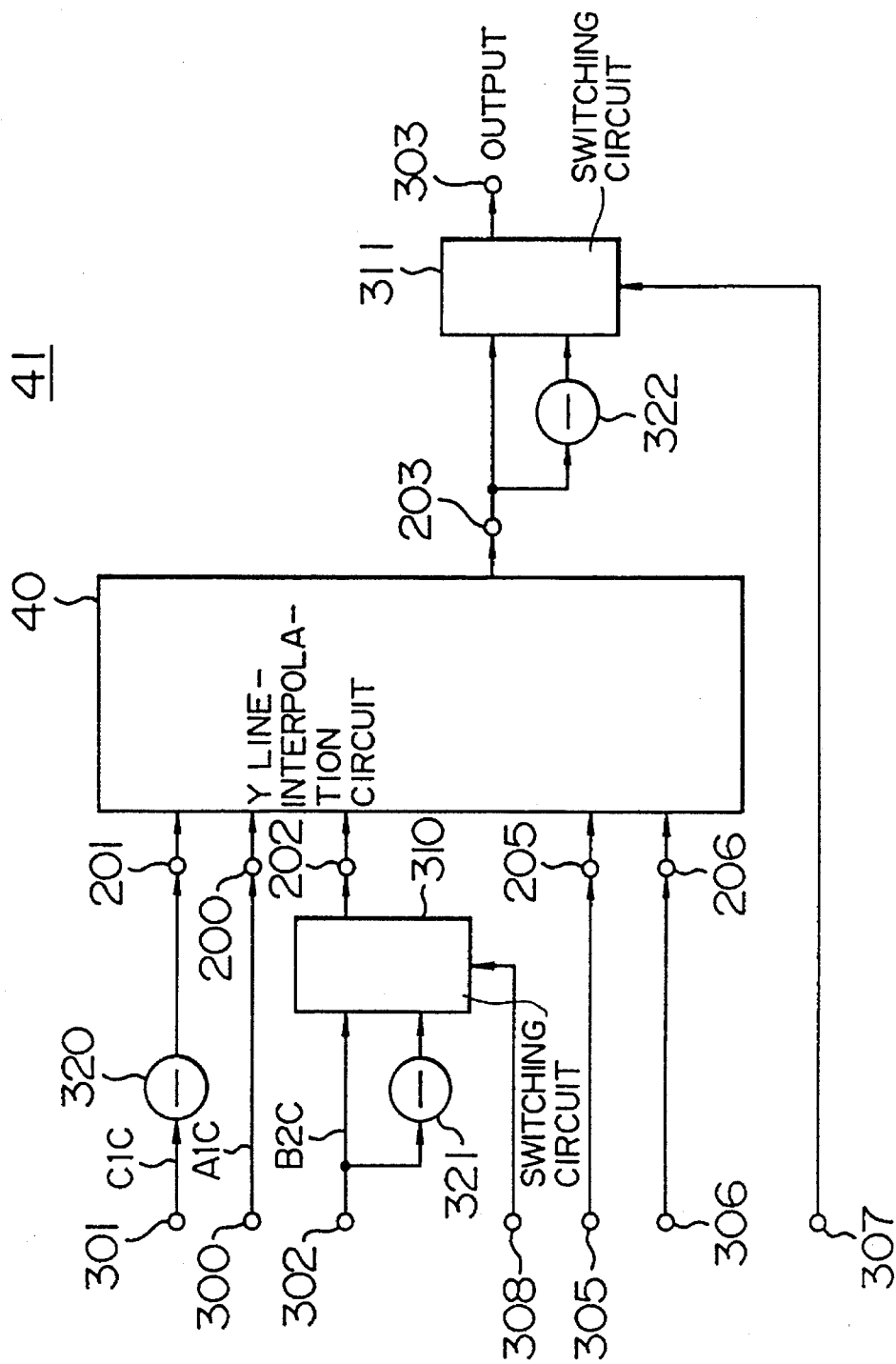
FIG. 5 is a block diagram showing a configuration of one embodiment of a C line-interpolation circuit of the present invention.

FIG. 5 is a block diagram showing a configuration of one embodiment of the C line-interpolation circuit 41. The C line-interpolation circuit 41 can be realized through the similar processing to that of the Y line-interpolation circuit 40 by taking the phase of the color subcarrier into consideration.

In FIG. 5, the reference numeral 300 designates an input terminal for the present color subcarrier A1C; the reference numeral 301 designates an input terminal for the output signal C1C of the delay circuit 43; the reference numeral 302 designates an input terminal for the signal B2C of the field which will be interlaced with the signal of the present field; the reference numeral 303 designates an output terminal for the signal after the signal processing; the reference numeral 305, an input terminal for the line-interpolation control signal sent from the signal control circuit 61; the reference numeral 306, an output terminal for the motion signal from the motion detection circuit 30; the reference numeral 307, an input terminal for the phase control signal of the carrier chrominance signal from the signal control circuit 61; 308, an input terminal for the signal which is sent from the signal control circuit 61 to represent whether the operation is the normal direction playback or the reverse playback; 320 to 322, phase inversion circuits which invert the respective phases; and 310 and 311, switching circuits.

The carrier chrominance signal A1C of the present field is inputted from the terminal 300 to the terminal 200 of the Y line-interpolation circuit 40. The carrier chrominance signal C1C from the delay circuit 43 is inputted through the terminal 301. In the case of the television signal of the NTSC system, the phase of the color subcarrier is inverted between the lines. Therefore, the carrier chrominance signal C1C which has been inputted through the terminal 301 is inputted to the phase inversion circuit 320 so that the phase of the carrier chrominance signal C1C is matched with that of the carrier chrominance signal A1C which has been inputted through the terminal 300. The output signal of the phase inversion circuit 320 is inputted to the terminal 201. The signal B2C which will be interlaced with the signal of the present field is inputted through the terminal 302. The signal B2C is inputted to both the switching circuit 310 and the phase inversion circuit 321 of which output is inputted to another terminal of the switching circuit 310. The control signal which has been sent from the signal control circuit 61 to represent whether the operation is in the normal direction playback state or in the reverse playback state is inputted through the terminal 308. As shown in FIG. 2A, in the case of the normal direction playback, since the phase of the color subcarrier of the position B2 is inverted version of that of the color subcarrier of the position A1, those color subcarriers need to be in phase with each other to perform the calculation processing. Therefore, the output of the phase inversion circuit 321 is selected. In the case of the reverse playback, since the phase relationship is inverted with respect to the case of the normal direction playback, the signal B2C sent from the terminal 302 is selected. That is, the signal of which phase is not inverted is selected. The output signal of the switching circuit 310 is inputted to the terminal 202. The line-interpolation control signal which has been sent from the signal control circuit 61 is inputted through the terminal 305 to be applied to the terminal 205. The motion signal sent from the motion detection circuit 30 is inputted through the terminal 306 to be applied to the terminal 206.

If the signal of which phase has been controlled as described above is inputted to the Y line-interepolation circuit 40, the line-interpolation can be performed in a similar manner to that in the luminance signal. The output signal of the Y line-interpolation circuit 40 through the terminal 203 is inputted to both the switching circuit 311 and the phase inversion circuit 322 of which output signal is inputted to another terminal of the switching circuit 311. The phase control signal which has been sent from the signal control circuit 61 is inputted through the terminal 307. As a result, the switching circuit 311 is controlled as shown in Table 1, and the phase of the color subcarrier is controlled so as to coincide with the output field number which is inputted through the terminal 4 to the signal control circuit 61, thereby to output an output signal through the terminal 303.

Figure 6:
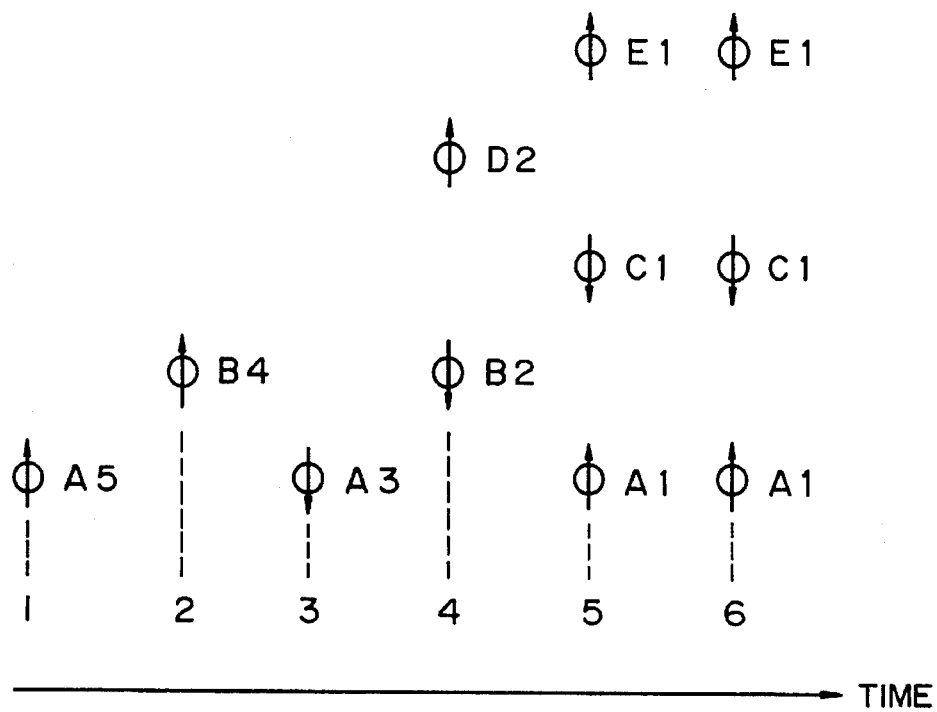
FIG. 6 is a view useful in explaining the operation of the present invention.

FIG. 6 is a view showing a state of the regenerative signal when performing the slow playback in the case where the same field is repeated from the previous field. The numbers shown in the lower portion of FIG. 6 represent the order of playback. In this case, the signal B2V which corresponds to the signal 4 before two fields and will be interlaced with the signal 6 of the present field is outputted from the first tap of the delay circuit with a tap 10. The signal A3V corresponding to the signal 3 before three fields is outputted from the second tap. The signal processing is the same as the normal signal processing. At this time, the signal of the field which is being reproduced at present is not written to the delay circuit with a tap 10. If a new field is reproduced next, it is possible to perform the same signal processing as that of the normal playback shown in FIG. 2.

Moreover, when the feed of the tape is stopped after the normal playback or the slow playback, the state of FIG. 6 will continue. Thus, this operation is performed as long as the signal of the same field is reproduced continuously.

Figure 7:
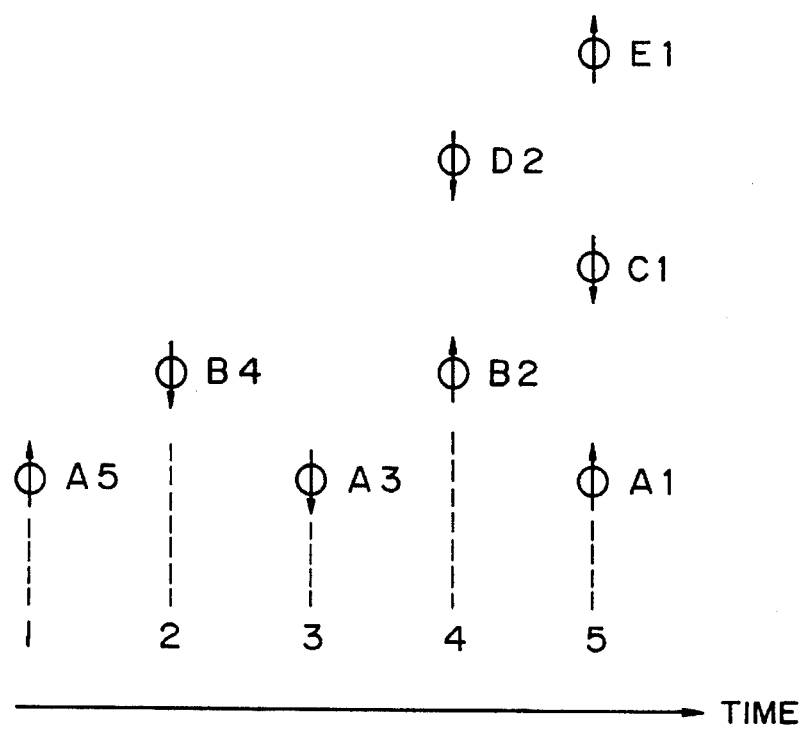
FIG. 7 is a view useful in explaining the operation of the present invention.

FIG. 7 is a view showing a situation of processing the regenerative signal when performing the reverse playback.

In the case of the reverse playback, the signal processing of the luminance signal is the same as that of the normal direction playback completly. As apparent from the comparison between the signals B2, B4 of FIG. 2A and those of FIG. 7 for example, the phase of the carrier chrominance signal is inverted version of that of the carrier chrominance signal in the normal direction playback. Therefore, since the phases of the signals A1C and B2C which are inputted to the C line-interpolation circuit 41 are inverted, in correspondence to the control signal which is inputted through the terminal 308 from the signal control circuit 61, the signal inputted through the terminal 302 is selected in the switching circuit 310. The signal processings other than this processing are the same as those in the case of the normal direction playback.

Figure 8:
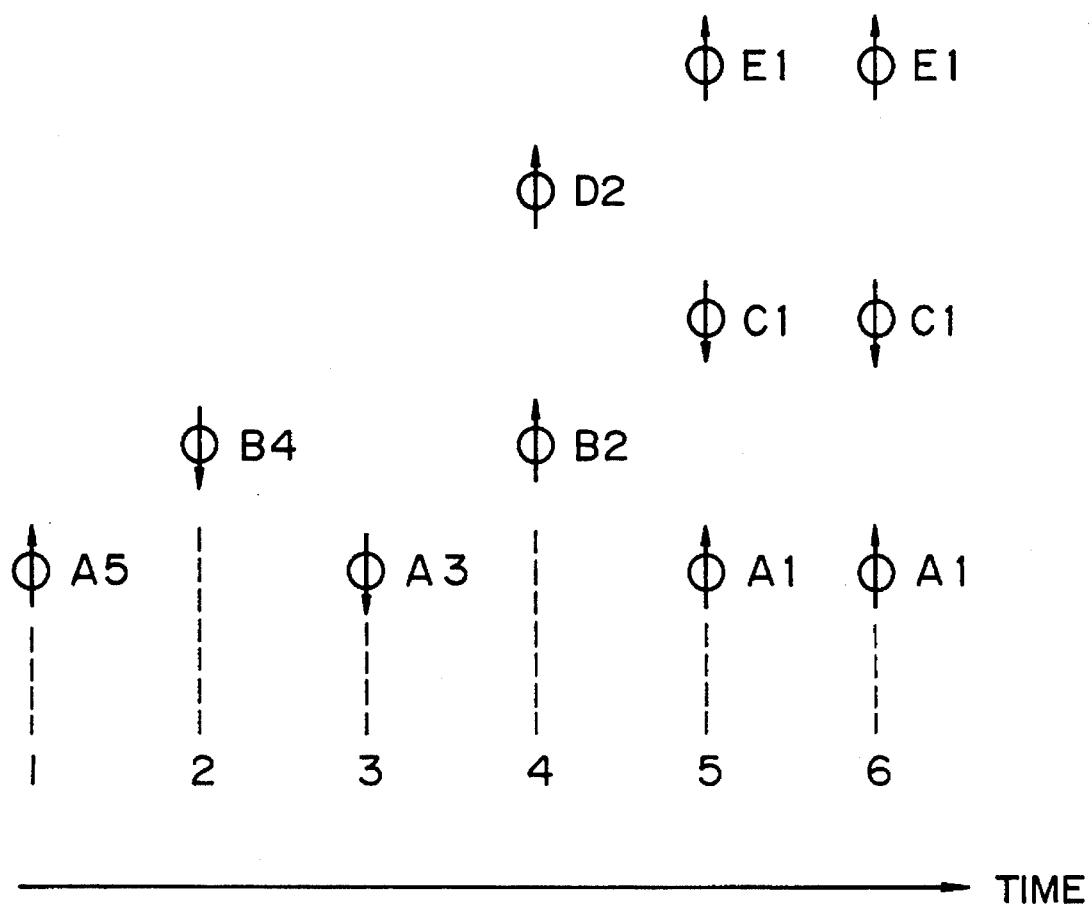
FIG. 8 is a view useful in explaining the operation of the present invention.

FIG. 8 is a view showing a stuation of processing the regenerative signal when performing the reverse slow playback in the case where the same field is repeated continuously after the prior field. The numbers of the lower portion of FIG. 8 represent the order of playback. In this case as well, the control signal is inputted through the terminal 308 from the signal control circuit 61 to the switching circuit 310, and the signal inputted through the terminal 302 is selected to be outputted. All of the signal processings other than this processing are the same as those in the case of the normal direction playback shown in FIG. 6. In the case where the feed of the tape is stopped after the reverse playback state to provide the stopping state, the signal of the same field will be further continuously inputted. Then, the signal which is being reproduced at present is not written to the delay circuit with a tap 10 so that the same processing as that when the tape of feed is stopped in FIG. 6 can be performed.

Thus, with the signal processing when the tape feed is stopped, the control of the carrier chrominance signal processing when the tape is stopped from the normal direction playback is different from that when the tape is stopped from the reverse playback.

Figure 9:
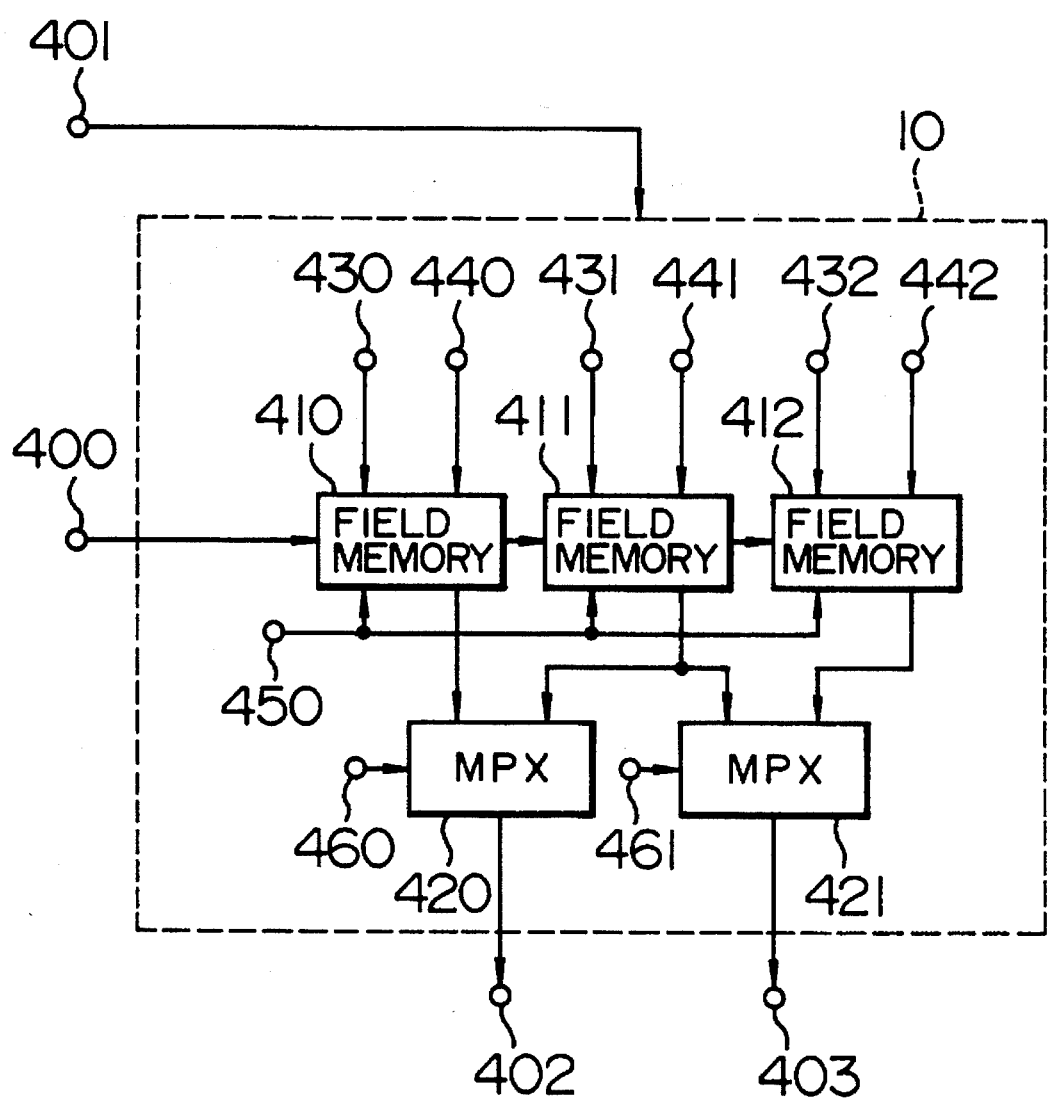
FIG. 9 is a block diagram showing an embodiment of a delay circuit with a tap relating to the present invention.

FIG. 9 is a block diagram showing a configuration of one example of the delay circuit with a tap 10. In FIG. 9, the reference numeral 400 designates an input terminal for the video signal of the delay circuit with a tap 10; the reference numeral 401 designates an input terminal for the control signal sent from the signal control circuit 61; the reference numerals 402 and 403 designate respectively output terminals connected to the first and second taps of the delay circuit with a tap 10; the reference numerals 410 to 412 designate field memories; the reference numerals 420 and 421 designate switching circuits; the reference numerals 430 to 432 designate respectively input terminals for the write control signal for controlling the timing for writing the signals to the field memories 410 to 412; the reference numerals 440 to 442, input terminals for the read control signal for controlling the read opertation; the reference numeral 450, an input terminal for the control signal for controlling the stopping of the write of the video signals to the memories 410 to 412; and 460 and 461, input terminals for the switching control signal for controlling the switching of the switching circuits 420 and 421.

The signal control circuit 61 checks the continuity of the field numbers of the regenerative video signal which has been inputted through the terminal 3. In each position where the field numbers are discontinuous, the circuit 61 outputs the delay control signal which is used to perform the control in such a way that the signals are outputted from the respective taps as described on referring to FIG. 2A and FIG. 6. That control signal is inputted as the write control signal, the read control signal and the switching control signal to the terminals 430 to 432, the terminals 440 to 442, and the terminals 460 and 461, respectively.

The field memory has the memory capacity of about one field. For example, in the case shown in FIG. 2A, the signal which has been inputted from the field memory 410 to the switching circuit 420 is selected by the switching circuit to be outputted, so that the video signal B2V to be outputted from the first tap 402 which is delayed by one field can be obtained from the first tap 402.

Similarly, the switching circuit 421 is controlled so that the video signal shown in FIG. 2A can be outputted from the second tap.

Next, the description will be given to the case where one field of the continuous video signals is repeatedly reproduced by two or more times in order to perform the adjustment of the playback time, the slow playback or the freeze play back.

As shown in FIG. 6, when the field 1 is reproduced two times in succession, it is discriminated on the basis of the regenerative field numbers inputted through the terminal 3 by the signal control circuit 61 shown in FIG. 1 that the same field is inputted two times in succession. The control signal from the signal control circuit 61 is inputted through the terminal 401 to the delay circuit with a tap 10 and then to the terminal 450, so that the write of the signals to the field memories 410 to 412 is stopped.

At this time, as described with reference to FIG. 6, the switching circuits 420 and 421 select the signals B2V and A3V to output them, respectively.

This is also applied to the case where the same field is reproduced over two or more fields. That is, so long as the same field continues, the write of the signals to the field memories 410 to 412 is stopped so that the signal processing can be performed.

Figure 10:
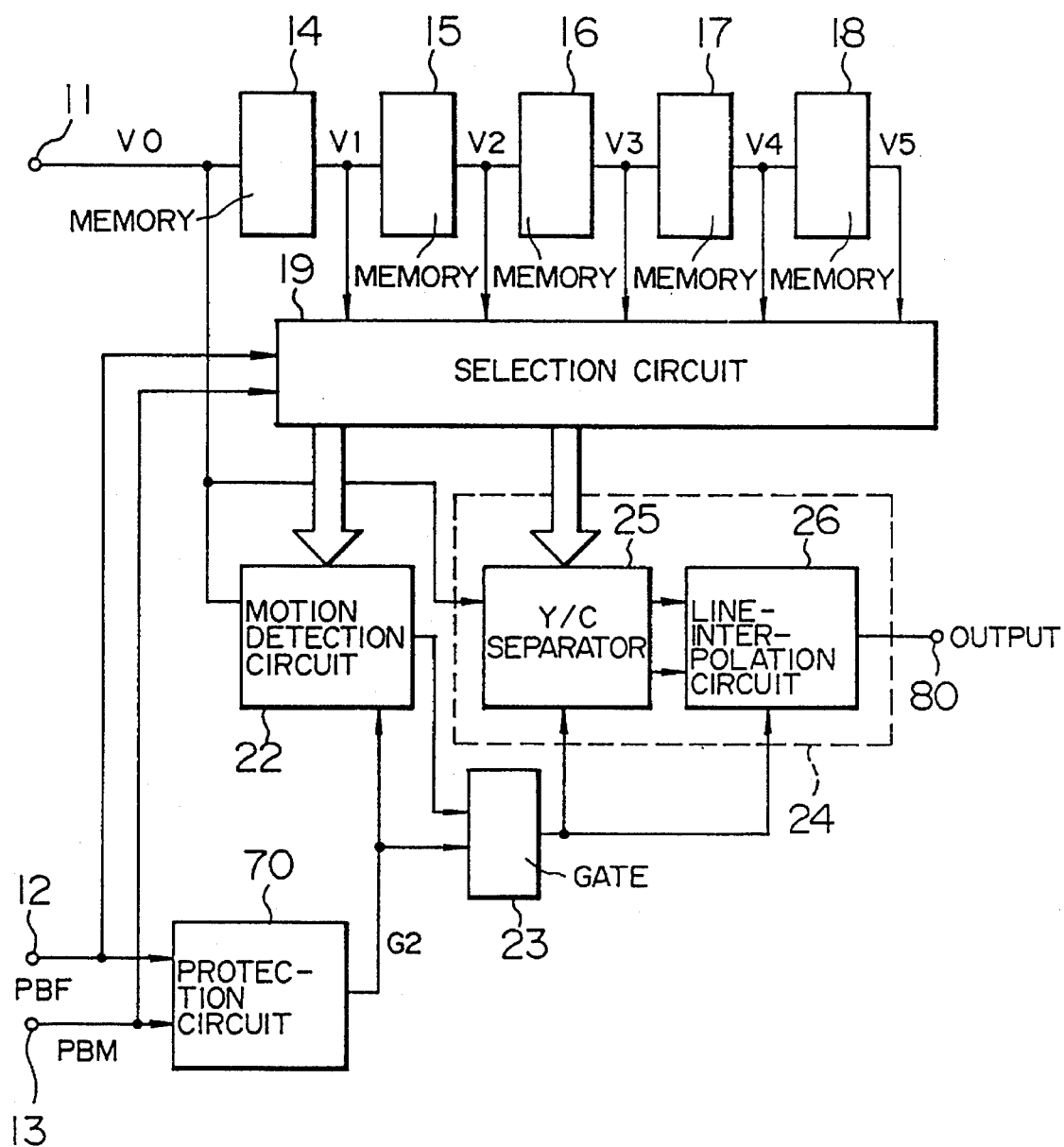
FIG. 10 is a block diagram showing a configuration of one embodiment of a field converter according to the present invention.

FIG. 10 is a block diagram showing a configuration of another embodiment of the field converter according to the present invention that is applied to a playback system of VTR for reproducing digitally the video signal of the NTSC system (hereinafter, referred to as "an NTSC signal", when applicable). In FIG. 10, the reference numeral 11 designates an input terminal for a regenerative video signal V0 of VTR; the reference numeral 12 designates an input terminal for information PBF for representing the field number of the regenerative video signal V0 (hereinafter, referred to as "field number information", when applicable); the reference numeral 13 designates an input terminal for a playback mode signal PBM for representing the playback state (the normal playback, the special playback and the like); the reference numerals 14 to 18 designate field memories; the reference numeral 19, a selection circuit for selecting one of output video signals V1 to V5 of the field memories 14 to 18 in correspondence to the playback mode signal PBM and the field number information PBF; the reference numeral 22, a motion detection circuit; the reference numeral 23, a gate circuit; the reference numeral 25, a Y/C separator for separating the video signal into a chrominance signal and a luminance signal; 26, a line-interpolation circuit; 24, a field conversion circuit; 70, a protection circuit for detecting the abnormality of the playback state to prevent the malfunction; and 80, an output terminal for the regenerative video signal after the signal processing.

Next, the operation of the present embodiment will be described. First, the description will be given to the basic signal processing in the normal playback state (i.e., the state in which the fields are reproduced in the order of the field numbers).

In FIG. 10, the regenerative video signal V0 of VTR (not shown) inputted through the input terminal 11 is delayed in a series of field memories 14 to 18 one field by one field. In those field memories 14 to 18, the control corresponding to the playback mode such as the normal playback or the special playback is performed by a control circuit (not shown). The video signals V1 to V5 outputted from the respective field memories 14 to 18 are supplied to the selection circuit 19. That is, when the selection circuit 19 are inputted, the video signals V1 to V5 which are respectively delayed by one, two, three, four and five fields with respect to the regenerative video signal V0. The selection circuit 19 selects one of the video signals V1 to V5 in correspondence to the playback mode signal PBM inputted through the input terminal 3 and the field number information PBF through the input terminal 2 to supply the video signal thus selected to both the motion detection circuit 22 and the field conversion circuit 24.

The motion detection circuit 22 is a circuit for judging whether the regenerative video signal V0 is the still image signal or the moving image signal every picture element. Various arrangements can be considered for that circuit. However, basically, that circuit is designed in such a way that the video signal is processed for calculation between the fields and the calculation result is outputted as the motion signal. For example, in the motion detection circuit shown in JP-A-3-13790, the signal corresponding to the difference between the video signal which is not delayed and the video signal which is delayed by one frame and the signal corresponding to the difference between the video signal which is not delayed and the video signal which is delayed by two frames are obtained to be composed. Then, the resultant composite signal is processed by the spatiotemporal filter to enlarge the motion region to obtain the motion signal.

Figure 11:
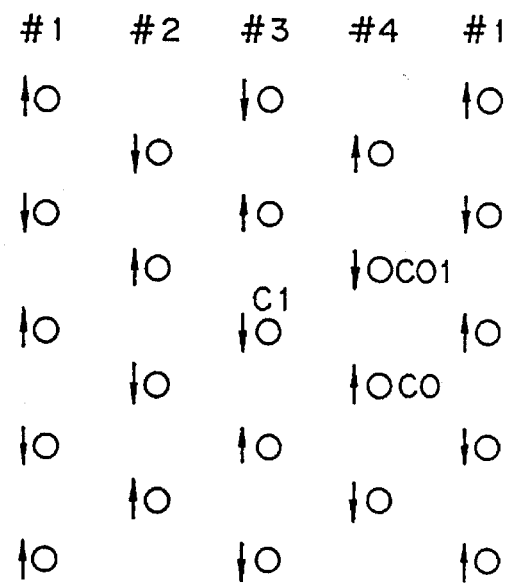
FIG. 11 is a view useful in explaining an NTSC signal.

The principle of the motion detection is based on the continuity of the phase of the color subcarrier (hereinafter, referred to as "a color phase", when applicable) in the NTSC signal and the interlace of the scanning lines. This will be described simply on referring to FIG. 11. FIG. 11 is a similar figure to FIG. 2.

In FIG. 11, #1, #2, #3 and #4 represent the respective field numbers, and each arrow in the figure represents the color phase. In the NTSC signal, the scanning lines are interlaced with one another every field, and the color phase is inverted every scanning line. Moreover, since one frame (=two fields) is composed of 525 scanning lines, after four fields (two frames), the same color phase is provided in the scanning line of the same position on the picture. When the subtraction processing is performed between the video signal and the video signal which is obtained by delaying the former by one frame, in the case where that video signal is the still image, the color phase of the former is inverted version of that of the latter, and the luminance signals thereof are equal to each other. Therefore, the chrominance component is obtained at the two-fold level, and the luminance component becomes zero. In the case of the moving image signal, however, since there is a different part in the luminance signals for one frame, as the result of performing the subtraction processing, a difference signal of the luminance signals is obtained in that part. Therefore, if the component of low frequency of the subtraction result is extracted by a low pass filter (hereinafter, referred to as "LPF", when aplicable), the difference signal of one frame of the luminance signal is obtained to become the motion signal.

Moreover, the color phase of the video signal matches with that of the video signal which is obtained by delaying that video signal by two frames. Therefore, in the case where that video signal is the still image signal, if the subtraction processing is performed with respect to those video signals, both the resultant luminance component and chrominance component become zero. In the case of the moving image signal, in the same manner as in the above case, the difference signal which is not zero is obtainmed. The subtraction results thus obtained are composed. Further, even if the video signal is the moving image signal, since the signal corresponding to a still part of the image is the same as the still image signal, the still image region and the moving image region are smoothly coupled. Therefore, the moving image region is enlarged by the spatiotemporal filter, and the signal which has been subjected to such a processing is outputted as the motion signal.

Figure 12:
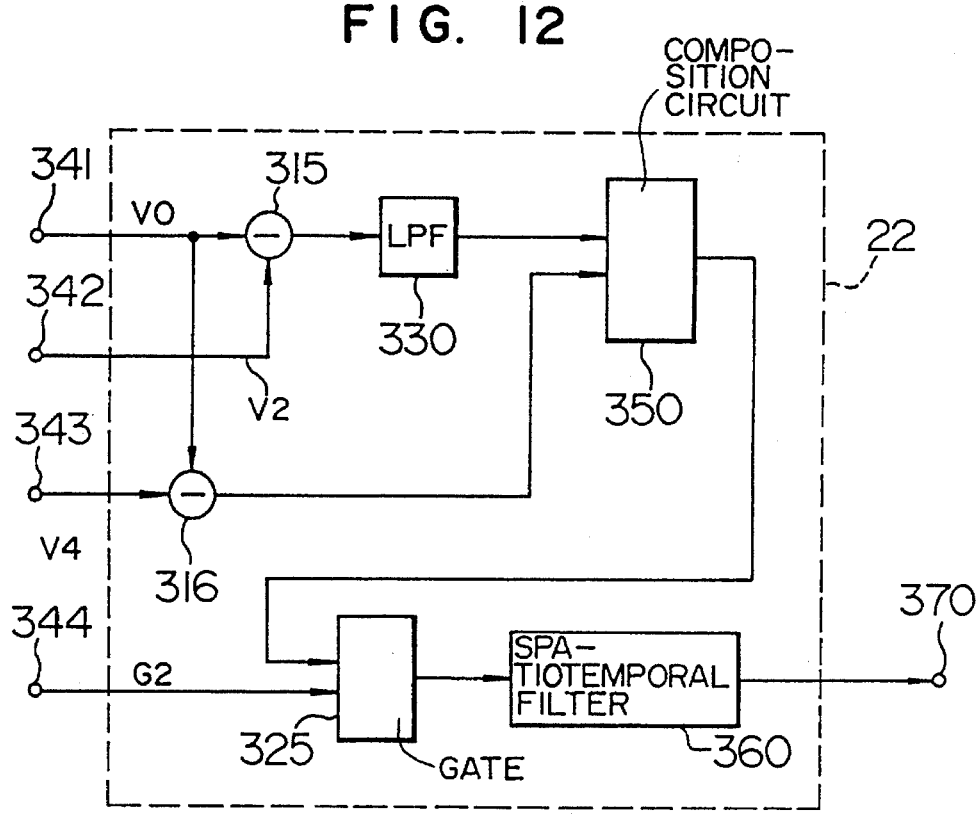
FIG. 12 is a block diagram showing a configuration of one concrete example of a motion detection circuit in the embodiment of FIG. 10.

FIG. 12 is a block diagram showing a configuration of one concrete example of the motion detection circuit 22 for performing such a signal processing. In FIG. 12, the reference numeral 341 designates an input terminal for the regenerative video signal V0; the reference numerals 342 and 343 designate input terminals for the output video signal of the selection circuit 19; the reference numeral 344 designates an input terminal for the gate signal sent from the protection circuit 70; the reference numerals 315 and 316, subtracters; the reference numeral 325, a gate circuit; the reference numeral 330, LPF; 350, a composition circuit; 360, a spatiotemporal filter; and 370, an output terminal for the motion signal.

In the figure, the regenerative video signal V0 is inputted to the input terminal 341, and the video signal which is prior to the regenerative video signal V0 by one frame (in this case, the video signal V2 from the field memory 15) is inputted to the input terminal 342 by being selected in the selection circuit 19. Moreover, the video signal which is prior to that signal V0 by two frames (in this case, the video signal V4 from the field memory 17) is inputted to the input terminal 343 by being selected in the selection circuit 19. Then, the subtracter 315 performs the subtraction processing with respect to the video signals V0 and V2, and the subtracter 316 performs the subtraction processing with respect to the V0 and V4. Only the component of low frequency of the different signal sent from the subtracter 315 is separated therefrom by LPF 330 to be composed with the different signal sent from the subtracter 316 in the composition circuit 350. The resultant composite signal is supplied to the gate circuit 325.

The gate circuit 325 is controlled by a gate signal G2 which has been outputted from the protection circuit 70 (refer to FIG. 10) to be inputted from the input terminal 344, and passes therefrom the output signal of the composition circuit 350 directly in the normal state (the operation when the playback state is abnormal will be described later). The output signal of the gate circuit 325 is supplied to the spatiotemporal filter 360. This spatiotemporal filter 360 is composed of a field memory, a line memory and the like, and processes the above calculation result so as to extend it in the horizontal, vertical and time directions to output the resultant signal as the motion signal through the output terminal 370. The operation of the motion detection circuit 22, in particular of the spatiotemporal filter 360 is explained in detail afterward.

Next, the description will be given to the field conversion circuit 24 of FIG. 10. The function of the field conversion circuit is the same as that of FIG. 1.

The field conversion circuit 24 is composed of the Y/C separator 25 and the line-interpolation circuit 26 and performs the under-mentioned signal processing. Showing the outline thereof, first, the regenerative video signal V0 which has been inputted is separated into the luminance signal and the chrominance signal by the Y/C separator 25 using the video signal selected in the selection circuit 19. Next, those luminance signal and chrominance signal are subjected to the respective line-interpolation processings by the line-interpolation circuit 26 in order to be corresponded to the field of the output, and also the color phase matching of the chrominance signal is performed in correspondence to the field of the output, and the resultant chrominance signal is added to the luminance signal to be outputted through the output terminal 80.

Figure 13:
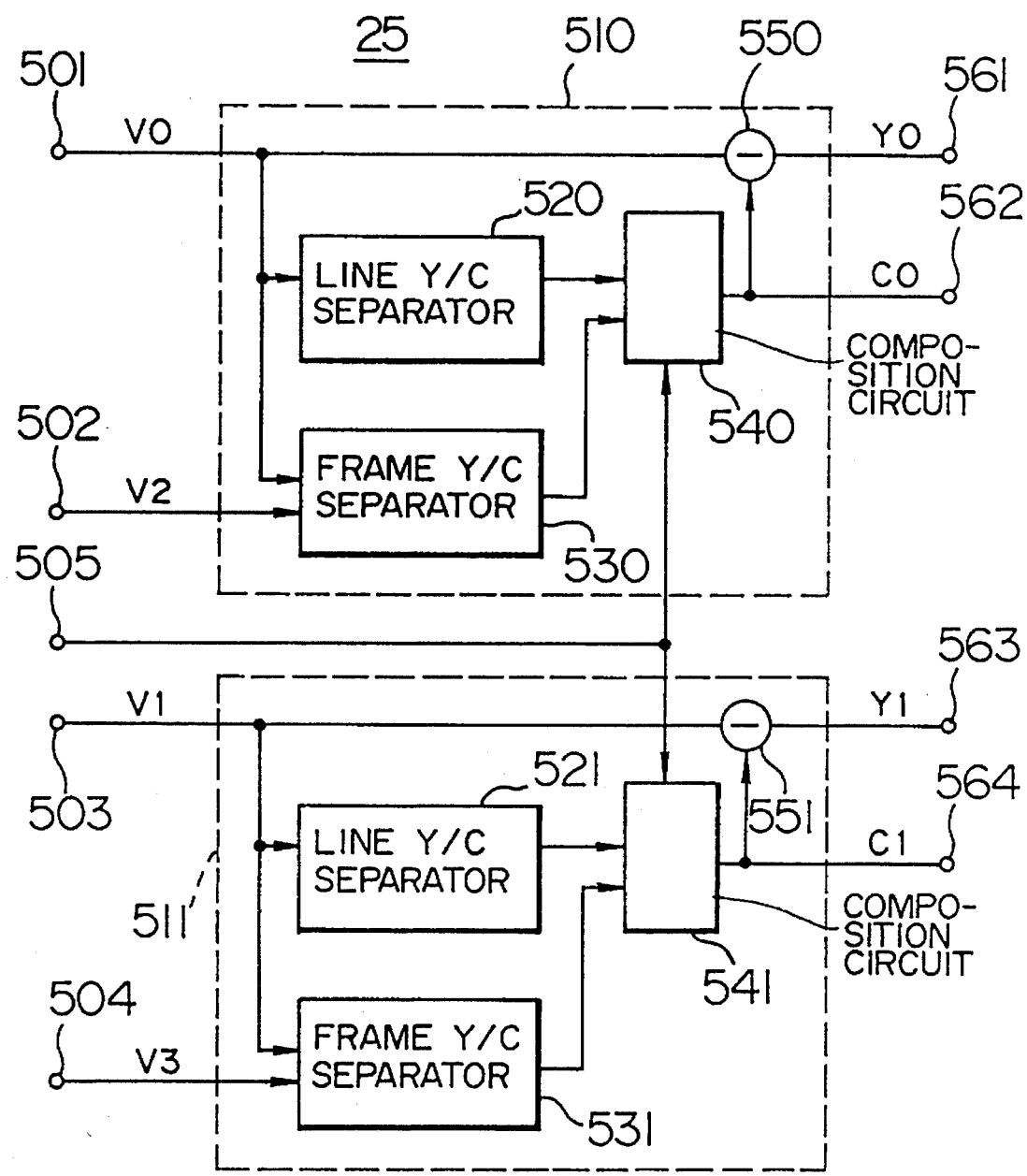
FIG. 13 is a block diagram showing a configuration of one concrete example of a Y/C separator in the embodiment of FIG. 10.

FIG. 13 is a block diagram showing a configuration of one concrete example of the Y/C separator 25. In FIG. 13, the reference numeral 501 designates an input terminal for the regenerative video signal V0; the reference numerals 502 to 504 designate input terminals for the video signal selected in the selection circuit 19; the reference numeral 505 designates an input terminal for the motion signal which is supplied through the gate circuit 23 from the motion detection circuit 22; the reference numeral 510 designates a signal processing circuit for the present field; the reference numeral 511 designates a signal processing circuit for the previous field; the reference numeral 520, an inter-line Y/C separator; the reference numeral 521, an inter-line Y/C separator; the reference numeral 530, an inter-frame Y/C separator; the reference numeral 531, an inter-frame Y/C separator; the reference numeral 540, a composition circuit which is controlled by the motion signal; 541, a composition circuit which is controlled by the motion signal; 550, a subtracter; 551, a subtracter; 561 and 563, output terminals for the luminance signal; and 562 and 564, output terminals for the chrominance signal.

In the figure, the regenerative video signal V0 (its field is designated the present field) is inputted through the input terminal 501, and the video signal which is prior to the regenerative video signal V0 by one frame (i.e., the video signal V2 from the field memory 15 selected in the selection circuit 19) is inputted through the input terminal 502. Both the video signals are supplied to the signal processing circuit for the present field 510. In the signal processing circuit for the present field 510, the chrominance signal of the regenerative video signal V0 and that of the video signal are separated through the inter-line Y/C separator 520 utilizing the line correlation in the regenerative video signal V0 and the inter-frame Y/C separator 530 utilizing the frame correlation (the silmilarity measure of the picture image) between the regenerative video signal V0 and the video signal V2 prior to the video signal V0 by one frame.

The inter-line Y/C separator 520 performs the subtraction processing with respect to the regenerative video signal V0 and the video signal which is obtained by delaying the video signal V0 by one line. Then, whether the regenerative video signal V0 is the still image signal or the moving image signal, the luminance signal has the line correlation (the similarity measure of the picture image) and the color phase is inverted between the lines. Therefore, whether the regenerative video signal V0 is the still image signal or the moving image signal, only the chrominance signal is separated in the inter-line Y/C separator 520.

The inter-frame Y/C separator 530 performs the subtraction processing with respect to the regenerative video signal V0 and the video signal V2 which is obtained by delaying the video signal V0 by one frame. Then, in the case where the regenerative video signal V0 is the still image signal, as shown in FIG. 11, the color phase of the video signal for one frame is inverted, and the luminance signal has the frame correlation. Therefore, the subtraction processing is performed with respect to the regenerative video signal V0 and the video signal V2 which is delayed by one frame with respect to the video signal V0 so that the luminance signal becomes zero. As a result, it is possible to separate the chrominance signal. However, in the case of the moving image signal, since the luminance signal has no frame correlation, it is impossible to separate only the chrominance signal.

The two chrominance signals which have been separated by the inter-line Y/C separator 520 and the inter-frame Y/C separator 530, respectively, are supplied to the composition circuit 540 which performs the composition processing corresponding to the motion signal inputted through the input terminal 505. Then, the composite signal is sent as the chrominance signal C0 to both the subtracter 550 and the output terminal 502. That is, the composition circuit 540 outputs only the chrominance signal from the inter-frame Y/C separator 530 when the regenerative video signal V0 is perfectly the still image signal, while outputting only the chrominance signal from the inter-line Y/C separator 520 when the signal V0 is perfectly the moving image signal. Further, when the regenerative video signal V0 is a video signal between the still image signal and the moving image signal, the composition circuit 540 composes the chrominance signal from the inter-frame Y/C separator 530 and the chrominance signal from the inter-line Y/C separator 520 in a predetermined ratio corresponding to the motion signal to output the composite signal.

The chrominance signal C0 which has been outputted from the composition circuit 540 is outputted through the output terminal 562 and also supplied to the subtracter 550 to be subtracted from the regenerative video signal V0. As a result, the luminance signal Y0 is separated to be outputted through the output terminal 561.

The signal processing circuit for the previous field 511 has the same arrangement as that of the signal processing circuit for the present field 510. The operation of the signal processing circuit for the previous field 511 is the same as that of the circuit 510 except that the video signal which is prior to the regenerative video signal V0 by one field (i.e., the video signal V1 from the field memory 14) is inputted through the input terminal 503, and the video signal which is prior to the regenerative video signal V0 by three fields (i.e., the video signal from the field memory 16) is inputted through the input terminal 504. Accordingly, the luminance signal Y1 and the chrominance signal C1 of the previous field are outputted through the output terminals 563 and 564 of the signal processing circuit for the previous field 511, respectively.

The luminance signals Y0, Y1 and the chrominance signals C0, C1 which have been obtained by the above processings are supplied to the line-interpolation circuit 26 of FIG. 10.

Figure 14:
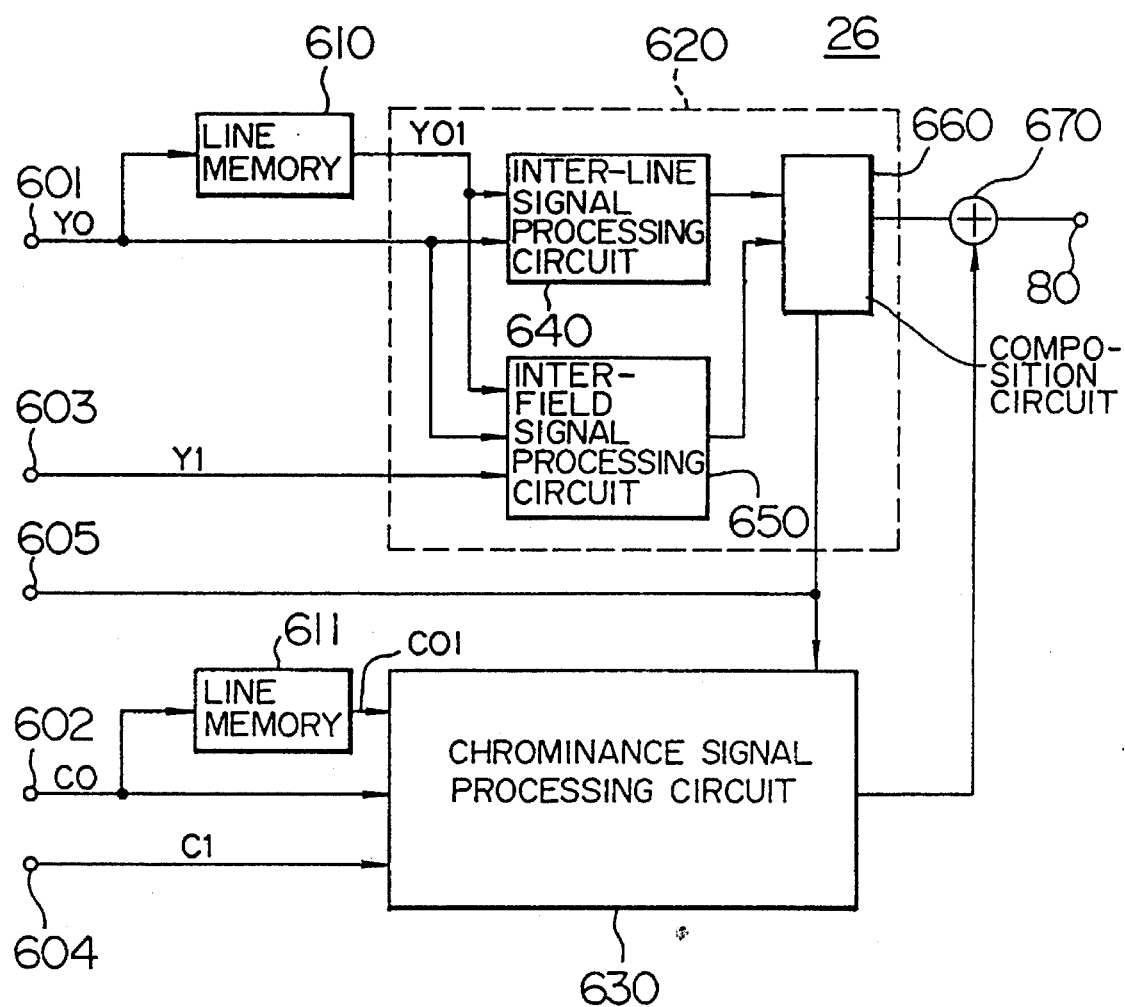
FIG. 14 is a block diagram showing a configuration of one concrete example of a line-interpolation circuit in the embodiment of FIG. 10.

FIG. 14 is a block diagram showing a configuration of one concrete example of the line-interpolation circuit 26 of FIG. 10. In FIG. 14, the reference numeral 601 designates an input terminal for the luminance signal Y0; the reference numeral 602 designates an input terminal for the chrominance signal C0; the reference numeral 603 designates an input terminal for the luminance signal Y1; the reference numeral 604 designates an input terminal for the chrominance signal C1; the reference numeral 605 designates an input terminal for the motion signal; the reference numerals 610 and 611, line memories; the reference numeral 620, a circuit for processing a luminance signal; the reference numeral 640, an inter-line signal processing circuit; the reference numeral 650, an inter-field signal processing circuit; 660, a composition circuit; 630, a circuit for processing a chrominance signal; 670, an adder; and 680, an output terminal.

In the figure, the luminance signal Y0 which has been inputted through the input terminal 601 is supplied to both the line memory 610 and the circuit for processing a luminance signal 620. Moreover, to the circuit 620 are also supplied a luminance signal Y01 which has been obtained by delaying the input luminance signal Y0 by one line, and the luminance signal Y1 of the previous field which has been inputted through the input terminal 603. The circuit 620 is basically composed of the inter-line signal processing (the moving image processing) circuit 640, the inter-field signal processing (the still image processing) circuit 650 and the composition circuit 660.

Figure 15A:
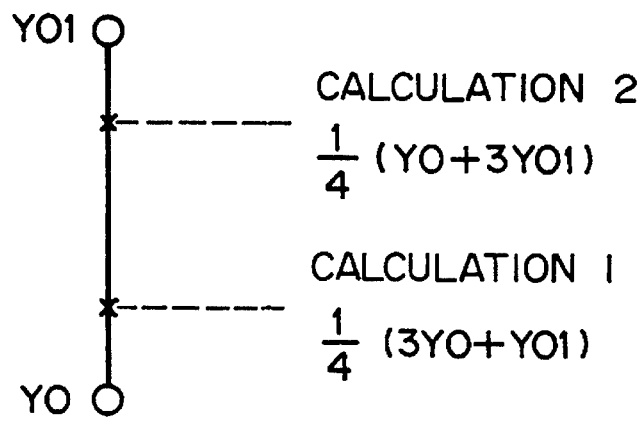
FIGS. 15A and 15B are views useful in explaining the line-interpolation processing of the line-interpolation circuit shown in FIG. 14.
Figure 15B:
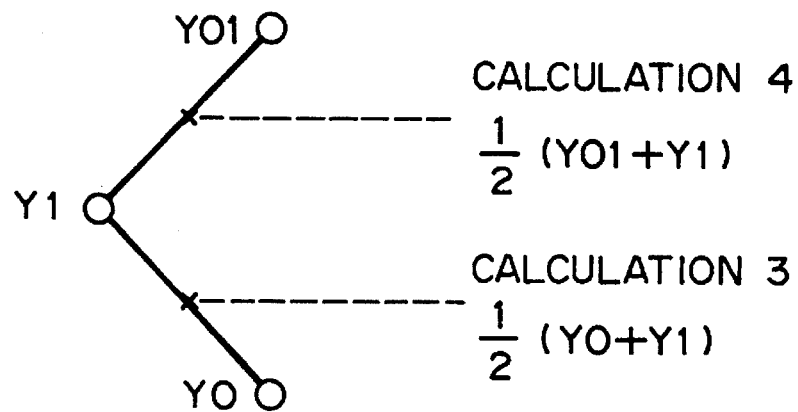

In the inter-line signal processing circuit 640, a calculation as shown in FIG. 15A is performed using the luminance signal Y0 of the present field and the luminance signal Y01 prior to the signal Y0 by one line. That is, in the conversion of the field number of the regenerative video signal into the field number of the output video signal in Table 1, in the case of the conversion of the field of odd number into the field of odd number or the conversion of the field of even number into the field of even number, the line-interpolation is performed on the basis of a calculation 1. Moreover, in the case of the conversion of the field of odd number into the field of even number or the conversion of the field of even number into the field of odd number, the line-interpolation is performed on the basis of a calculation 2. In the inter-field signal processing circuit 650, the calculation as shown in FIG. 15B is performed using the luminance signal Y0 of the present field, the luminance signal Y01 prior to the signal Y0 by one line, and the luminance signal Y1 prior thereto by one field. That is, in the case of the conversion of the field of odd number into the field of odd number or the conversion of the field of even number into the field of even number, the line-interpolation is performed on the basis of a calculation 3. Moreover, in the case of the conversion of the field of odd number into the field of even number or the conversion of the field of even number into the field of the odd number, the line-interpolation is performed on the basis of a calculation 4. Incidentally, the processing by the inter-field signal processing circuit 650 is available in the case of the still image, i.e., in the case where the correlation is present between the fields.

The output signals of the inter-line signal processing circuit 640 and the inter-field signal processing circuit 650 which have been obtained through the above calculation processings are composed in the composition circuit 660 in correspondence to the motion signal which have been inputted through the input terminal 605. That is, the composition circuit 660 outputs the output signal of the inter-field signal processing circiit 650 as the luminance signal subjected to the line-interpolation when the regenerative video signal V0 is perfectly the still image signal, while outputting the output signal of the inter-line signal processing circuit 640 as the luminance signal subjected to the line-interpolation when the regenerative video signal V0 is perfectly the moving image signal. Further, when the regenerative signal V0 is a video signal between the still image signal and the moving image signal, the circuit 660 composes the output signal of the inter-field signal processing circuit 650 and the output signal of the inter-line field signal processing circuit 640 in a predetermined ratio corresponding to the motion signal to output the composite signal as the luminance signal subjected to the line-interpolation.

On the other hand, in the chrominance signal processing circuit 630, the signal processing which is basically the same as that of the luminance signal processing circuit 620 is performed with respect to the chrominance signal C0 sent through the input terminal 602, the chrominance signal C1 sent through the input terminal 604 and the chrominance signal C01 which is obtained by delaying the chrominance signal C0 by one line in the line memory 611. As shown in FIG. 11, the color phase of the chrominance signal C01 which is prior to the chrominance signal C0 of the present field by one line, and that of the chrominance signal C1 which is prior to the chrominance signal C0 of the present field by one field are necessarily inverted versions of that of the signal C0. Therefore, after the chrominance signals C01 and C1 are inverted, the same processing as that of the above luminance signal is performed. Since the concrete signal processing is the same as that of the luminance signal, the description thereof is omitted here for the sake of simplicity. After completion of the calculation processing, in the same manner as the processing of the luminance signal, the result of the inter-line signal processing and that of the inter-field signal processing are composed in correspondence to the motion signal. Further, the color phase matching of the chrominance signal is performed in correspondence to the field number to be outputted. As a result, the chrominance signal which has been subjected to the line-interpolation is obtained. This chrominance signal is added to the luminance signal which has been sent from the luminance signal processing circuit 620 in the adder 670 to be outputted as the NTSC signal subjected to the field conversion from the output terminal 80.

The description has been given to the signal processing in the normal playback state (i.e., in the state in which the field numbers are reproduced in order). However, the nonstandard speed play is essential to VTR. In this case, the field numbers are not continuous. But, the selection circuit 19 performs the operation of selecting one of the outputs of the field memories 14 to 18 in such a way that the above signal processing can be performed. The description will hereinbelow be given to the operation of the selection circuit 19 in this case.

The signal calculations in the detection circuit 22 and the field conversion circuit 24, which have already been explained, are performed by utilizing the conditions of the field interlace and the color phase of the NTSC signal. The selection circuit 19 selects one of the output video signals of the field memories 14 to 18 in such a way that such calculations can be performed, and sends the output video signal thus selected to both the motion detection circuit 22 and the field conversion circuit 24.

Now, as one example thereof, the description will be given to the case of the nonstandard speed play of 0 to 1 fold playback speed on referring to FIG. 16. Incidentally, in the figure, No. represents a time series of the field unit, #1, #2, #3 and #4 represent the field numbers, V0 represents the regenerative video signal, and V1, V2, V3, V4 and V5 represent the output video signals of the field memories 14, 15, 16, 17 and 18, respectively. In this case, it is assumed that before No. 1, the video signal is reproduced with the field numbers being continuous in order. In the present example, the state in which the same field is reproduced occurs from No. 3 to No. 5 because of the playback of 0 to 1 fold playback speed. While not illustrated in FIG. 10, when the same field is supplied, the field memories 14 to 18 are controlled by a control circuit (not shown) in such a way that the writing is stopped (for a field period of No. 4 and No. 5, in the example of FIG. 16) and the video signal which has already been written is repeatedly read out. As a result, the input video signals of the selection circuit 19, i.e., the field numbers of the output video signals V1 to V5 of the field memories 14 to 18 are as shown in FIG. 16. For the input video signals V1 to V5, as described above, the selection circuiit 19 selects the necessary video signal to supply it to both the motion detection circuit 22 and the field conversion circuit 24.

Then, the video signals required for the motion detection circuiit 22 are, as described above, the video signal which is to be inputted through the input terminal 342 and prior to the field number of the regenerative video signal V0 by one frame, and the video signal which is to be inputted through the input terminal 343 and prior to that field number of the signal V0 by two frames. Therefore, as shown in FIG. 16, normally (i.e., when the field numbers are continuous in order), the output video signals V2 and V4 of the field memories are supplied to the motion detection circuit 22. However, when the same field of #3 is repeatedly reproduced as in No. 4 and No. 5, #1 before one frame and #3 before two frames must be inputted to the motion detection circuit 22. Therefore, the output video signal V3 and V5 of the field memories must be supplied. Thus, the selection circuit 19 operates in such a way that the video signal prior to the regenerative signal V0 by one frame and the video signal prior to the signal V0 by two frames are always supplied.

Moreover, the video signals which are prior to the regenerative video signal V0 by one, two and three fields are required for the Y/C separator 25 of the field conversion circuit 24. Therefore, as shown in FIG. 16, normally, the video signals V1, V2 and V3 are supplied to the Y/C separator 25 of the field conversion circuit 24. However, when the same field is repeatedly reproduced, the video signals V2, V3 and V5 must be supplied, and therefore, the selection circuit 19 operates in such a way that the video signals which are prior to the regenerative video signal V0 by one, two and three fields are always supplied.

Incidentally, in this case, the description has been given by taking the playback of 0 to 1 fold playback speed as an example. However, even in the case of the playback of −1 to 0 fold playback speed or the playback of about 1 playback speed, in the same manner as in the above case, the selection circuit 19 switches the output signals of the field memories 10 to 14 to supply the necessary video signal to the motion detection circuit 22 and the field conversion circuit 24.

Next, the description will be given to the protection circuit 70 shown in FIG. 10.

In VTR, the playback state gets abnormal, i.e., the field sequence may be destroyed in some cases due to the period up to the servo lock, the switching of the playback mode, the servo abnormality and the like. For example, it is assumed that in the above-mentioned playback of 0 to 1 fold playback speed, the abnormal state as shown in FIG. 17 occurs. This example shows the specific case where the regenerative fields #1 and #2 are missing are lacked between No. 4 and No. 5 so that the regenerative field jumps over three fields. Normally, in the playback of 0 to 1 fold playback speed, such a state cannot occur. Thus, if such an abnormal state is not detected, the selection circuit 19 performs the normal operation. Therefore, the video signals as shown in FIG. 17 are supplied to the motion detection circuit 22 and the field conversion circuit 24. Therefore, in the inter-field signal processing part in the field conversion circuit 24, predetermined signals cannot be supplied in the normal operation mode. That is, the video signals #1 and #3 which are prior to the regenerative video signal V0 (#3) of No. 5 by one frame and two frames in the motion detection circuit 22, and the video signals #2, #1 and #4 which are prior to the video signal V0 by one field, two fields and three fields in the Y/C separator 25 of the field conversion circuit 24 cannot be supplied in the abnormal operation mode. Therefore, malfunction will occur in the motion detection circuit 22 and the Y/C separator 25 for the periods indicated by oblique lines. But, since in the field conversion circuit 24, the signal processing is performed using only the regenerative video signal V0 in the inter-line signal processing part of the Y/C separator 25 and that of the line-interpolation circuit 26, the malfunction will not occur.

Figure 18:
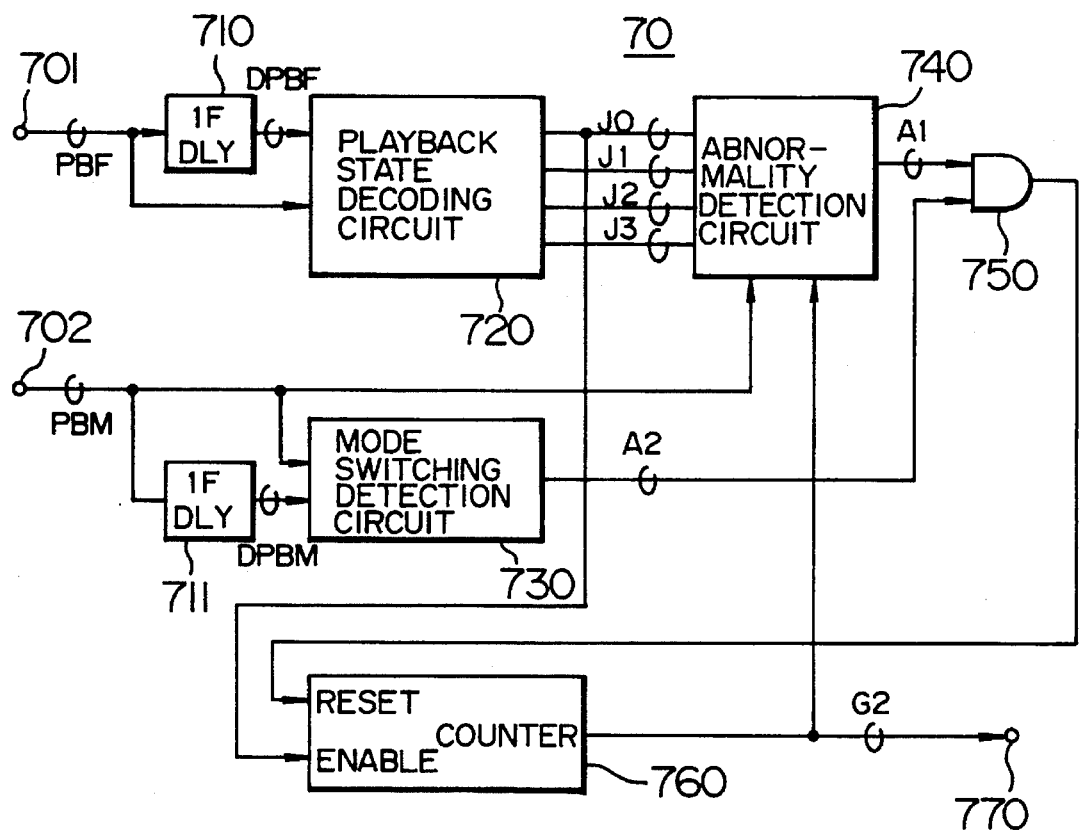
FIG. 18 is a block diagram showing a configuration of one concrete example of a protection circuit shown in FIG. 10.

The protection circuit 70 is a circuit for preventing the video signal obtained from the output terminal 80 from coming to grief even if the above abnormal state occurs. FIG. 18 is a block diagram showing a configuration of one concrete example of the protection circuit 70. In FIG. 18, the reference numeral 701 designates an input terminal for the field number information PBF; the reference numeral 702 designates an input terminal for the playback mode signal PBM; the reference numerals 710 and 711 designate one field delaying circuits; the reference numeral 720 designates a playback state decoding circuit; the reference numeral 730, a mode switching detection circuit; the reference numeral 740, an abnormality detection circuit; 750, an AND gate; 760, a counter circuit; and 770, an output terminal for the gate signal G2.

In the figure, the field number information PBF which has been inputted through the input terminal 701, and the field number information DPBF which has been obtained by delaying PBF in the one field delaying circuit 710 are inputted to the playback state decoding circuit 720. The playback state decoding circuit 720 compares the field number information PBF and DPBF to output state signals J0, J1, J2 and J3. In this case, the state signal J0 becomes a low level (hereinafter, referred to as "an L level", when applicable) only when the field number information PBF is posterior to the field number information DPBF by 0 field (i.e., when the same field is reproduced). The state signal J1 becomes the L level only when PBF is posterior to DPBF by one field. The state signal J2 becomes the L level only when PBF is posterior to DPBF by two fields. Moreover, the state signal J3 becomes the L level only when PBF is posterior to DPBF by three fields. Each of those state signals J0 to J3 becomes a high level (hereinafter, referred to as "an H level", when applicable) in any case other than the above cases. Those state signals J0, J1, J2 and J3 are supplied to the abnormality detection circuit 740 and also the state signal J0 is supplied as a stop signal to the counter circuit 760.

The playback mode signal PBM which has been inputted through the input terminal 702 and the gate signal G2 which has been outputted from the counter circuit 760 are supplied to the abnormality detection circuit 740 which detects the abnormal state in correspondence to the state signals J0, J1, J2, J3, the playback mode signal PBM and the gate signal G2. For example, in the playback of 0 to 1 fold playback speed, the operation is in a normal state in both the case where the playback field advances by one field (the state signal J1 is at L level) and the case where the same field is reproduced (the state signal J0 is at L level). Any other state, i.e., the case where the state signals J2 and J3 become the L level is impossible in the playback of 0 to 1 fold playback speed. Therefore, the abnormality detection circuit 740 detects such an impossible state as an abnormal state to output an abnormality detection signal of L level A1. Thus, when the impossible state occurs in the present playback mode, the abnormality detection circuit 740 detects that state as the abnormal state.

On the other hand, the playback mode signal PBM which has been inputted through the input terminal 702, and the playback mode signal DPBM which has been obtained by delaying PBM in one field delaying circuit 711 are supplied to the mode switching detection circuit 730. For example, when the playback mode is switched from the playback mode of 0 to 1 fold playback speed to the reverse playback mode, it is impossible to estimate the playback state which will occur for a period up to the lock of the servo by that switching. Therefore, the mode switching detection circuit 730 detects that the playback mode has been switched, thereby to output a mode switching detection signal A2 of L level.

The abnormality detection signal A1 and the mode switching detection signal A2 are supplied to the AND gate 750. When at least one of the abnormality detection signal A1 and the mode switching detection signal A2 is at L level, the AND gate 750 outputs a signal of L level. The output signal of L level of the AND gate 750 is supplied as a reset signal to the counter circuit 760. After the reset, the counter circuit 760 outputs a gate signal G2 for a predetermined period. In this case, the predetermined period is a period from the time point when the abnormal state is detected to the time point when each signal processing circuit can start the normal operation, i.e., a period over four fields indicated by oblique lines in the example of FIG. 17.

Incidentally, the level of the abnormality detection signal A1 and that of the mode switching detection signal A2 may be set arbitrarily. Correspondingly, instead of the AND gate 750, other gate circuits may be employed.

The abnormality detection circuit 740 also performs the operation of detecting the abnormal state corresponding to the gate signal G2. In the signal processing circuit of the present embodiment, if the video signals of at least continuous four fields are not provided, it is impossible to perform the normal signal processing. For this reason, if the abnormal state occurs at once, the signal processing which is performed between the fields cannot restart until the video signals of the continuous four fields have been reproduced. Therefore, for a period when the gate signal G2 is at H level, the abnormality detection circuit 740 performs the abnormality detection which is different from the above-mentioned operation.

First, in the case where the state signal J1 is at L level, since the fields are reproduced in order, there is no problem. Next, in the case where when the abnormal state is detected and the gate signal G2 is at H level, the state signals J2 and J3 become the L level, the circuit 740 detects this state as abnormality irrespective of the playback mode. Then, the counter circuit 760 is reset and starts the counting operation again from that time point. Therefore, for a predetermined period from that time point, the gate signal G2 of H level is started being outputted again. Moreover, in the case where when the gate signal G2 is at H level, the state signal J0 becomes the L level, this does not result in the abnormality. However, this does not mean that the video signals of the continuous four fields are reproduced because the same field is reproduced as long as the state signal J0 is at L level. Then, as has already been described, the protection circuit 70 is designed in such a way that as long as the state signal J0 is at L level, the counting operation of the counter circuit 760 is stopped temporarily, and the gate signal G2 is kept at H level, and when the next field is reproduced and the state signals J0 and J1 become the H level and the L level, respectively, the counting operation is started again, and the gate signal G2 is at H level until the counting value reaches a predetermined value. As a result, if the abnormal state occurs at once, the gate signal G2 is kept at H level until the signals of the continuous four fields are reproduced.

In a manner as described above, the protection circuit 70 detects the time point when the abnormal state occurs and the playback mode is switched. Then, for a period from that time point to a time point when the video signals are reproduced by the predetermined continuous field number (four fields in the present embodiment), the gate signal G2 of H level is outputted.

Incidentally, in the present embodiment, the regenerative field numbers are used for the detection of abnormality of the playback state. However, the present invention is not limited thereto or thereby. That is, any signal such as a time code may be used as long as it is a signal capable of monitoring the playback state.

Next, the description will be given to the operations of the signal processing circuits for a period when the gate signal G2 is at H level (designated "a protection period").

First, the description will be given to the motion detection circuit 22 shown in FIG. 12. It is assumed that in the motion detection circuit 22, the output of the composition circuit 350 is directly supplied to the spatiotemporal filter 360. Then, in the case where the abnormal state shown in FIG. 17 occurs, the under-mentioned problem will arise. That is, for example, for a period indicated by the oblique lines of FIG. 17, the video signals which are prior to the regenerative video signal V0 by one frame and two frames are not inputted through the input terminals 342 and 343 to the motion detection circuit 22. Therefore, the output signals of the subtracters 315 and 316 are not proper different signals. For this reason, if the output signal of the composition circuit 350 is supplied directly to the spatiotemporal filter 360, this increases the influence of the wrong calculation results in the horizontal, vertical and time directions. Therefore, even if the apparatus is returned to the normal state, that influence will continue for some time. This is not preferable.

Then, in the motion detection circuit 22, the gate circuit 325 is provided between the composition circuit 350 and the spatiotemporal filter 360. For a period when the gate signal G2 is at H level, the output signal of the gate circuit 325 supplied to the spatiotemporal filter 360 is forcedly set to a predetermined value, e.g., the same value as in the case of the still image. As a result, it is possible to prevent the malfunction of the motion detection circuit 22 in the case of the abnormal state.

In the Y/C separator 25 of the field conversion circuit 24 shown in FIG. 13, the inter-line Y/C separator 520 processes only the regenerative video signal V0. Therefore, even if the abnormal state as shown in FIG. 17 occurs, there is no problem. However, since the predetermined video signals are not supplied to the inter-line Y/C separator 521, and the inter-frame Y/C separators 530 and 531 for the period indicated by the oblique lines of FIG. 17, the precise Y/C separation cannot be performed. Therefore, the proper chrominance signals cannot be obtained from the composition circuits 540 and 541. As a result, the proper luminance signals cannot be obtained in the output terminals 561 and 563. That is, when the abnormal state occurs, the precise Y/C separation output can be obtained only from the inter-line Y/C separator 520.

Then, in the Y/C separator 25, for the period when the gate signal G2 is at H level, the composition circuit 540 selects only the chrominance signal sent from the inter-line Y/C separator 520 by the motion signal from the input terminal 505 to output it, whereby the luminance signal Y0, and the chrominance signal C0 as that chrominance signal are outputted from the output terminal 561 and the output terminal 562, respectively. At this time, the luminance signal Y1 and the chrominance signal C1 which have been outputted from the signal processing circuit for the prior field 511 are not proper signals.

On the other hand, in the line-interpolation circuit 26 shown in FIG. 14, for the period when the gate signal G2 is at H level, the luminance signal Y0 and the chrominance signal C0 of the present field which have been supplied from the Y/C separator 25 are precise signals, and the luminance signal Y1 and the chrominance signal C1 of the previous field are not precise signals. Therefore, in the case where the luminance signal processing circuit 620 and the chrominance signal processing circuit 630 are designed in such a way as to output the luminance signal and the chrominance signal, which have been subjected to the calculation processing in the inter-field signal processing circiit using the luminance signal Y1 and the chrominance signal C1 of the previous field, by the motion signal inputted through the input terminal 605, this does not mean that the proper line-interpolation is performed.

Then, in the line-interpolation circuit 26, by the motion signal from the input terminal 605, the composition circuit 660 selects only the output luminance signal of the inter-line signal processing circuit 640 in the luminance signal processing circuit 620 to output it. Similarly, in the chrominance signal processing circuit 630 as well, only the chrominance signal from the inter-line signal processing circuit in regard to the chrominance signal of the present field C0 is outputted. As a result, both the luminance signal and the chrominance signal which have been properly subjected to the line-interpolation are obtained.

As described above, for the period when the gate signal G2 is at H level, the Y/C separator 25 and the line-interpolation circuit 26 of the field conversion circuit 24 forcedly perform the inter-line signal processing, i.e., the signal processing in the case of the moving image signal, whereby even if the abnormal state occurs, the resultant video signal which has been subjected to the field conversion is prevented from being influenced by the abnormality. Then, in order to operate the field conversion circuit 24 in such a manner, in FIG. 10, for the period when the gate signal G2 is at H level, the gate circuit 23 outputs the motion signal when the regenerative video signal V0 is perfectly the moving image signal.

While the embodiments of the present invention have been described, the present invention is not limited thereto or thereby. For example, each of the present embodiments may be designed in such a way as to control the motion signal. However, the present invention is not limited thereto or thereby. That is, it is to be understood that any other system may be available as long as it makes forcedly the signal processings of the Y/C separator and the line-interpolation circuit the inter-line signal processing.

Morover, while the NTSC signal (i.e., the composite video signal in which the luminance signal and the chrominance signal are superposed on each other) is an object of the above embodiments, the present invention is not limited thereto or thereby. That is, the present invention is also available to the case of the component video signal in which the luminance signal and the chrominance signal are separated from each other. In the case of the component video signal, the motion detection circuits are individually required for the luminance signal and the chrominance signal, and the luminance signal and the chrominance signal are separated from each other from the start. Therefore, only the Y/C separator becomes unnecessary so that the circuit arrangement of this example is practically the same as that of the present embodiments. Even in this case, the apparatus is designed in such a way that when the abnormal state is detected by the protection circuit 70, the field conversion circuit performs forcedly the inter-line signal processing by the gate signal G2. As a result, it is possible to prevent the malfunction of the apparatus.

The operation of the motion detection circuit, especially the spatiotemporal filter 360 of FIG. 12 will hereinbelow be described in detail.

First, the description will be given to the prior art motion detection circuit.

As for the motion detection circuit for detecting motion of an image, there is well known the circuit disclosed in JP-A-3-13790.

Figure 19:
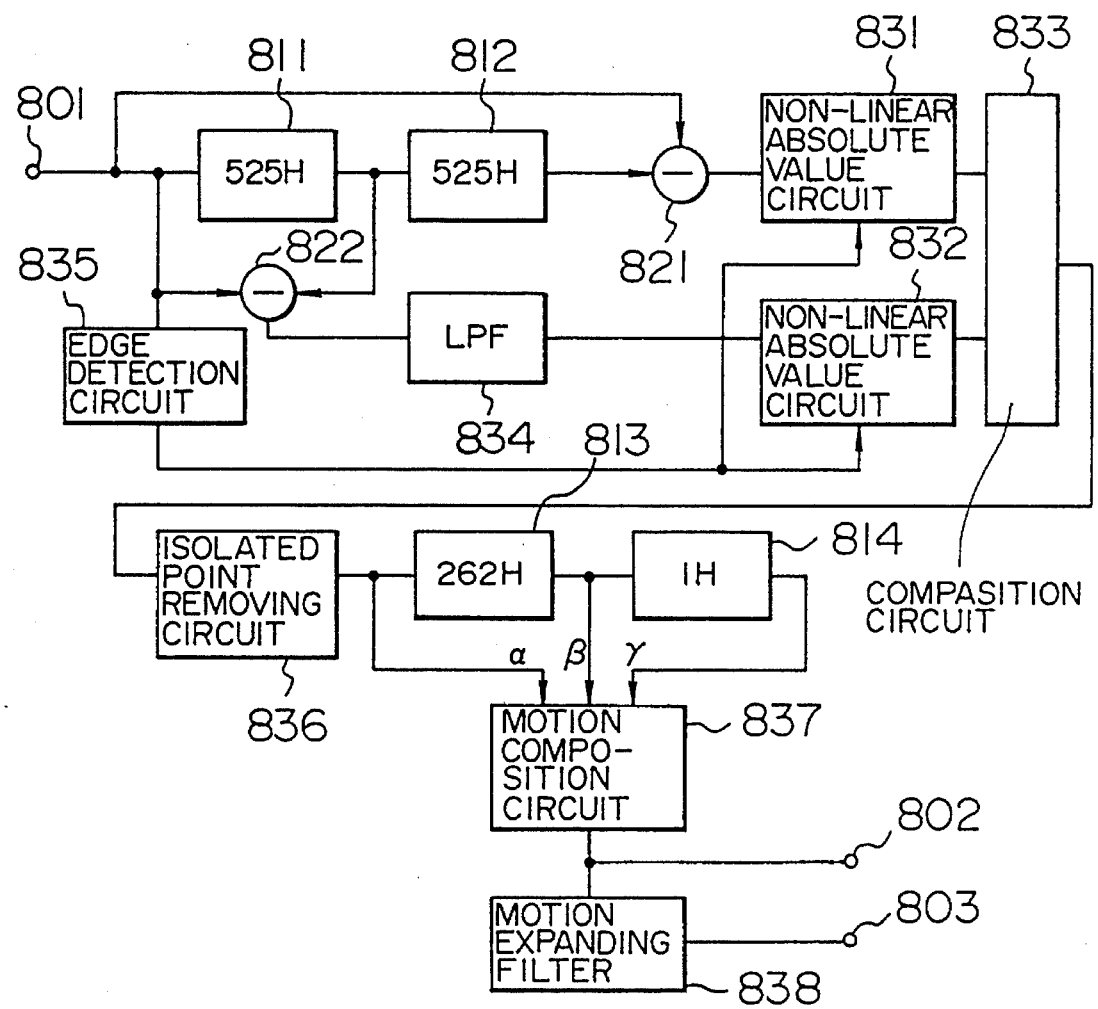
FIG. 19 is a block diagram showing a configuration of the prior art motion detection circuit.

FIG. 19 is a block diagram showing a configuration of that motion detection circuit.

In FIG. 19, the reference numeral 801 designates an input terminal for inputting therethrough a video signal; the reference numerals 802 and 803 designate output terminals which are respectively connected to the Y/C separator and the line-interpolation circuit to output the motion quantities detected by the present circuit; the reference numerals 811 and 812 designate delay circuits for delaying the input video signal by one frame; the reference numerals 813 and 814 designate delay circuits which have a 262 horizontal scanning period (hereinafter, the horizontal scanning period is referred to as "H" for short, when applicable) and 1H, respectively; the reference numerals 821 and 822, subtracters; the reference numerals 831 and 832, nonlinear absolute value circuits; the reference numeral 833, a composition circuit; the reference numeral 834, a low pass filter for passing therethrough only a signal having a frequency area lower than an arbitrary frequency (hereinafter, referred to as "LPF" for short, when applicable); the reference numeral 835, an edge detection circuit; 836, a circuit for removing an isolated point; 837, a motion composition circuit; and 838, a motion expanding filter.

With the present apparatus, the video signal which has been inputted through the input terminal 801 is delayed suitably in the delay circuits 811 and 812. The input video signal and the output of the delay circuit 812 are inputted to the subtracter 821 to obtain a motion signal of a difference between two frames. On the other hand, after the input video signal and the output of the delay circuit 811 are subjected to the subtraction processing in the subtracter 822, the component of the chrominance signal is removed through LPF 834 to obtain the motion signal of a difference between two fields (one frame).

The motion signal of the difference between two frames and the motion signal of the difference between two fields are subjected to the non-linear processing and the absolute value processing in the respective non-linear absolute value circuits 831 and 832 in accordance with the edge information detected by the edge detection circuit 835 and then composed with each other while being weighted in the composition circuit 833. For the motion signal which has been outputted from the composition circuit 833, the influence of the noise and the like thereupon is removed by the isolated point removing circuit 836.

A motion signal α which has been outputted from the isolated point removing circuit 836, a motion signal β which has been delayed by 262 H in the delay circuit 813 and a motion signal γ which has been further delayed by 1 H in the delay circuit 814 are inputted to the composition circuit 837 to be composed with one another while being weighted using respective coefficients k1, k2 and k3. Thereafter, the resultant signal is outputted from the output terminal 802 to be used to control the Y/C separator 25. The Y/C separator is a circuit which carries out selectively the line Y/C separation and the frame Y/C separation in accordance with the motion quantity.

Moreover, in the motion expanding filter 838, the motion composite signal which has been outputted from the motion composition circuit 837 is dulled spatiotemporally to be outputted from the output terminal 803, thereby to control the line-interpolation circuit.

Figure 20A:
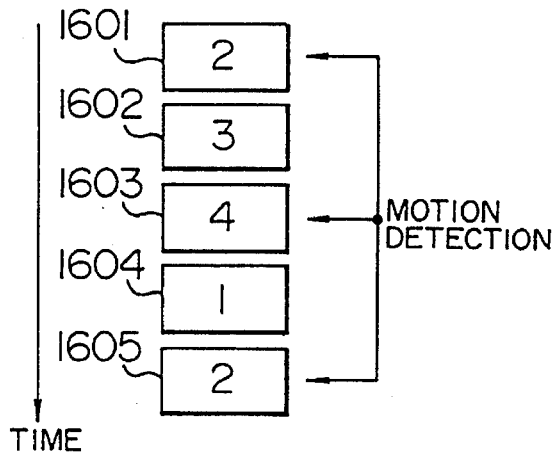
FIGS. 20A and 20B are diagrams useful in explaining the operation of the prior art motion detection circuit shown in FIG. 19.

FIG. 20A is a diagram showing a state in which the recorded moving image is normally reproduced.

In the figure, the reference numerals 1601, 1602, 1603, 1604 and 1605 designate continuous video signals which are reproduced in order from the tape and correspond to the respective one fields.

The motion detection is, as shown in the figure, performed by obtaining the difference between two frames and the difference between two fields on the basis of the data 1605, 1603 and 1601.

Figure 20B:
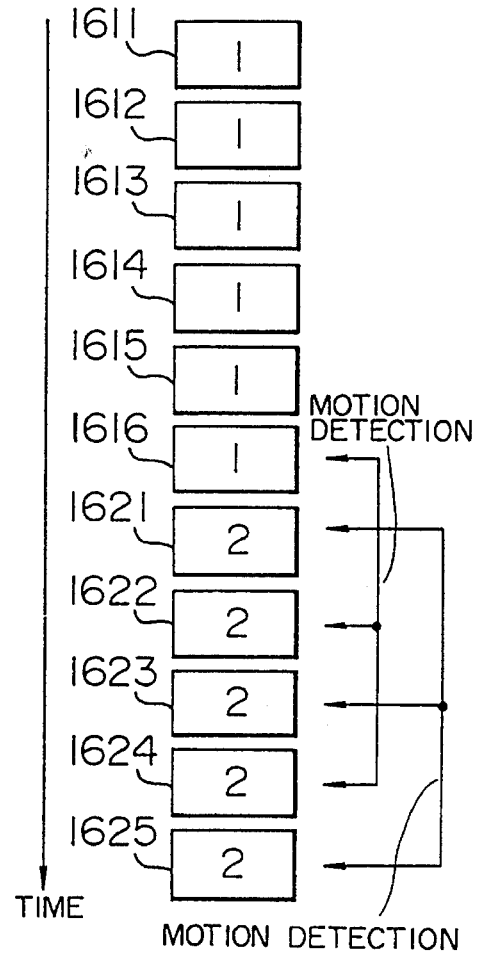

FIG. 20B is a diagram showing an example in the case where the same image is reproduced by the slow motion playback of ⅙ time. In this case, the same video signal is repeatedly reproduced by six times. That is, the video signals 1611 to 1616 have the same picture image and field number as those of the video signal 1601, and the video signals 1621 to 1625 have the same picture image and field number as those of the video signal 1602.

Now, in FIG. 20B, in the case where the field of the data, e.g., the data 1624 is converted, in the prior art motion detection circuit, the motion detection is performed with respect to the difference between two frames and the difference between two fields on the basis of the data 1616 and the data 1622, and as a result, it is judged on the basis of the motion detection result of the difference between two frames that the regenerative video signal is a moving image. Therefore, the field conversion circuit performs the field conversion using an inter-line processing by utilizing only the data 1624.

However, in the case where the field of the data 1625 is converted, since the above-mentioned prior art motion detection circuit performs the motion detection of the difference between two frames and the difference between two fields on the basis of the data 1621 and the data 1623 in the same field as that of the data 1625, the circuit judges the data 1625 to be a still image. Therefore, the field conversion circuit performs the field conversion using an inter-field processing by utilizing both the data 1625 and the data 1616 which is the data just before the repetition of the regenerative image is started and is stored in the memory means and of which scanning lines are interlaced with those of the data 1625. As a result, since the regenerative video signal as the moving image is subjected to the field conversion using an inter-field processing, the afterimage is generated in the data after the field conversion so that the regenerative image is remarkably degraded.

That is, there arises a problem in that in the case where the same field is repeatedly reproduced for a certain period in the slow motion for example, with the circuit disclosed in JP-A-3-13970, the motion of the regenerative video signal cannot be detected properly, and the control of the Y/C separator and the line-interpolation circuit is failed.

Figure 21:
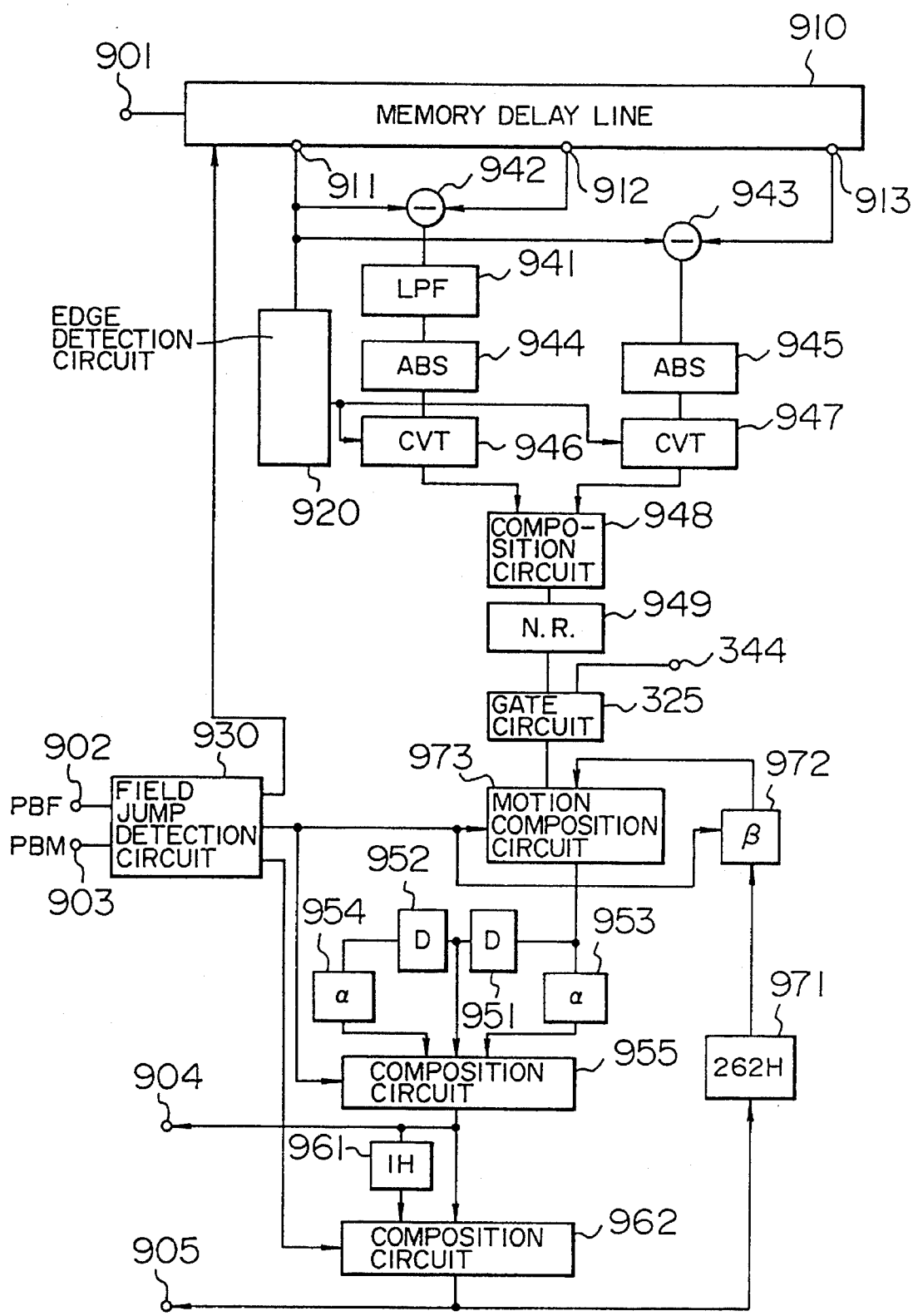
FIG. 21 is a block diagram showing a detailed configuration of the motion detection circuit shown in FIG. 12.

A detailed configuration of the motion detection circuit 22 is, together with those of the memories 14 to 18 and the selection circuit 19 of FIG. 10, shown in FIG. 21.

In the figure, the reference numeral 901 designates an input terminal for the image data reproduced; the reference numeral 902 designates an input terminal through which the field number of the image data inputted to the terminal 901 is inputted; the reference numeral 903 designates an input terminal through which the playback mode of VTR or the like is inputted; the reference numeral 904, an output terminal through which the motion signal detected is inputted to the Y/C separator 25; and the reference numeral 905, an output terminal through which the motion signal detected is outputted to the line-interpolation circuit 26.

The reference numeral 910 designates a memory delay line which delays suitably the image data inputted through the input terminal 901 to output the data required for the motion detection in accordance with the situation of the playback of the image data. The reference numeral 911 designates an output terminal through which the regenerative image data inputted through the input terminal 901 is directly outputted. The reference numeral 912 designates an output terminal through which the image data, which is prior to the image data outputted through the output terminal 911 by one frame, or the image data corresponding thereto is outputted. The reference numeral 913 designates an output terminal through which the image data, which is prior to the image data outputted through the output terminal 911 by two frames, or the image data corresponding thereto is outputted.

The reference numeral 920 designates an edge detection circuit for detecting the edge part of the picture image of the image data. The reference numreral 930 designates a field jump detection circuit for receiving the field number and the playback mode of the image data inputted thereto to detect the occurrence of the repeat playback of the image and the like. The reference numeral 941 designates LPF for passing therethrough only a signal having a frequency area lower than an arbitrary frequency.

The reference numerals 942 and 943 designate subtracters; the reference numerals 944 and 945 designate absolute value circuits for subjecting the input data to the absolute value processing; the reference numerals 946 and 947 designate motion signal conversion circuits for converting the level of the input signal in accordance with the edge information detected by the edge detection circuit 920; the reference numeral 948 designates a composition circuit for composing the motion signal of the difference between two fields and the motion signal of the difference between two frames with each other while weighting them using respective arbitrary coefficient values; the reference numeral 949 designates a noise removing circuit; the reference numerals 951 and 952 designate delay circuits each of which delays the motion signal by one clock when the motion signal is sampled at a frequency four times as large as that of the color subcarrier; the reference numerals 953 and 954, coefficient multipliers each of which has an arbitrary coefficient value α; the reference numeral 955, a composition circuit for composing the output of the delay circuit 951 and the outputs of the coefficient multipliers 953 and 954 with one another while weighting them using respective arbitrary coefficients; the reference numeral 961, a delay circuit of 1 H; the reference numeral 962, a composition circuit for composing the output of the composition circuit 955 and the output of the delay circuit 961 with each other while weighting them using respective arbitrary coefficients; 971, a delay circuit of about 262 H which can store the image data of about one field; 972, a coefficient multiplier which has an arbitrary coefficient value β; and 973, a motion composition circuit for composing the output of the noise removing circuit 949 and the output of the coefficient multiplier 972 with each other while weighting them using respective arbitrary coefficients.

The description will hereinbelow be given to the operations of the memory delay line 910, the motion detection circuit and the field jump detection circuit 130.

The field number of the image data which has been inputted through the input terminal 902 is inputted to the field jump detection circuit 130. In the field jump circuit 930, the field number of the present field which has been inputted through the input terminal 902 and the field number of the field which is prior to the present field by one field and stored in the field jump detection circuit 930 by being inputted through the input terminal 902 are compared with each other. Then, if the playback mode inputted through the input terminal 903 is the normal direction playback and the field number of the present field is posterior to the field number of the previous field by one field, the play is judged to be the normal playback. If the field number of the present field is posterior to the field number of the previous field by two or more fields, the play is judged to be the fast forward playback. On the other hand, if the field number of the present field is not posterior thereto, the play is judged to be the slow motion playback including the still.

Moreover, if the playback mode inputted through the input terminal 903 is the reverse playback and one or more field numbers of the present field are returned with respect to the field number of the previous field, the play is judged to be the reverse fast forward playback including the −1 fold speed playback. If not, the play is judged to be the slow motion playback including the still playback. Then, the judgement result is outputted to the memory delay line 910, the composition circuits 955 and 962, the coefficient multiplier 972, the motion composition circuit 973 and the like.

The image data which has been inputted through the input terminal 901 is inputted to the memory delay line 910. Since with the image data reproduced, the scanning lines are interlaced with one another every field, in order to perform the motion detection, it is necessary to obtain the difference between the signals in the same position. Therefore, the signal of the difference between two fields (one frame), or the signal of the difference between four fields (two frames) is required. Then, after the information of the field jump is inputted from the field jump detection circuit 930 and the suitable delay processing is performed in the inside, the image data of the present field, the image data corresponding to the image data which is prior to the image data of the present field by one frame, and the image data corresponding to the image data which is prior to the image data of the present field by two frames are outputted through the output terminals 911, 912 and 913 of the memory delay line 910, respectively, in such a way that in the memory delay line 910, even when the error occurs in the field sequence during the special playback, the proper motion detection can be performed.

The delay processing of the memory delay line 910 will be described with reference to FIGS. 22A and 22B.

Figure 22A:
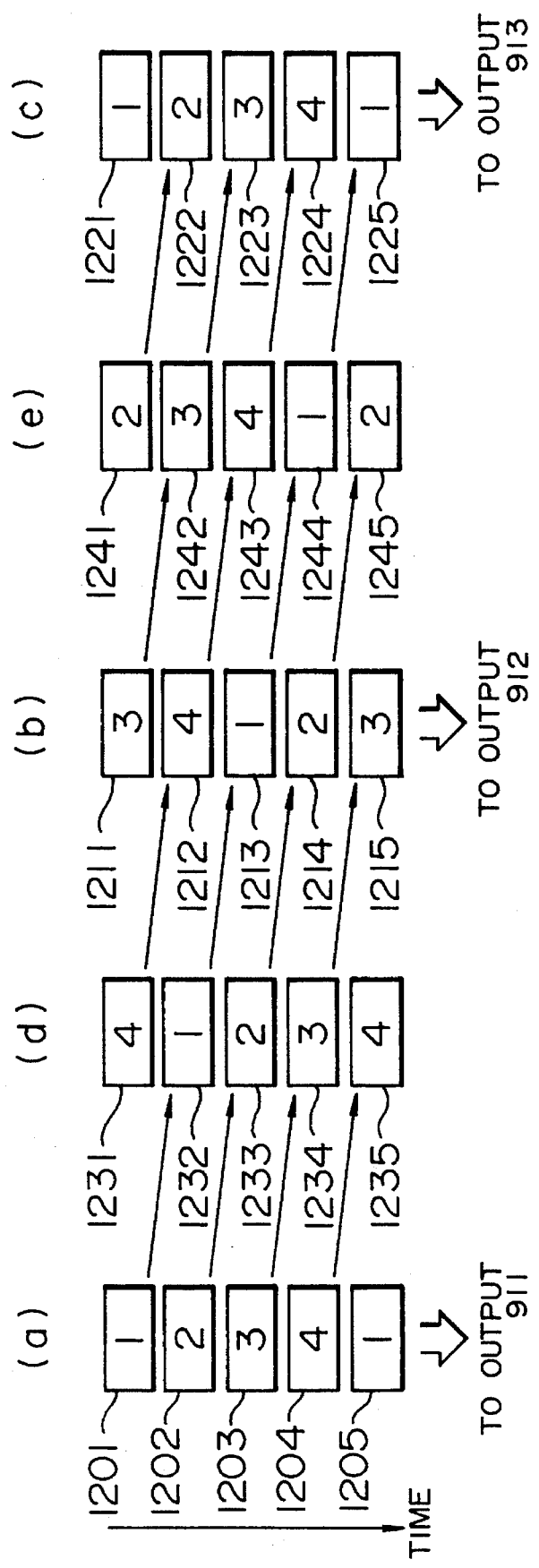

In FIG. 22A, the reference symbol (a) designates the image data inputted through the input terminal 901, and the reference symbols (d), (b), (e) and (c) designate the field memories each of which stores the image data of one field.

Moreover, the reference numerals 1201 to 1296 designate the image data of one field, and the numerical characters in the frames designate the field numbers of the image data after the playback. Moreover, in the figure, the time changes from above downward. That is, the image data of the same line represents the input image data and the delayed image data which is stored in the field memories at the same time point, and the data of the line thereunder represents the input image data and the delay image data stored in the field memories at the time point after the time corresponding to one field elapsed.

Now, FIG. 22A shows the case of the normal playback. In the figure, the reference numerals 1201 to 1205 of (a) designate the continuous image data.

The image data (a) is inputted through the output terminal 911. The field memory (d) stores the image data which has been delayed through the delay line 910 by one field, the field memory (b) stores the image data which has been delayed through the memory delay line 910 by one frame (two fields), the field memory (e) stores the image data which has been delayed through the memory delay line 910 by three fields, and the field memory (c) stores the image data which has been delayed through the memory delay line 910 by two frames (four fields).

As a result, the image data 1211 is outputted through the output terminal 912 of FIG. 21 in the same timing as that of the image data 1201, and the image data 1212 is outputted therethrough in the same timing as that of the image data 1202.

Moreover, the image data 1221 is outputted through the output terminal 913 of FIG. 21 in the same timing as that of the image data 1201 and 1211, and the image data 1222 is outputted therethrough in the same timing as that of the image data 1202 and 1212.

FIG. 22B shows a state in the case of the slow motion playback. In the figure, the reference symbol (a) designates the image data which is inputted through the input terminal 901. The reference numerals 1250 to 1257 designate the continuous image data. In this connection, the image data 1251 to 1254 is the image data in the same field, and the image data 1255 to 1257 is the image data in the subsequent same field. In the same manner as in the normal direction playback, the image data is outputted, as the image data of the present field, through the output terminal 911 of FIG. 21 directly.

When the field jump information from the field jump detection circuit 930 represents that the play is the special playback such a the slow motion playback, first, the image data of (a) is inputted to the field memory (d) in sequence to be delayed by one field. Then, only the image data 1281 and 1285 just before the field numbers change out of the image data of the field memory (d) is written to the field memory (b) of the subsequent stage. On the other hand, the field memory holds the image data thus written thereto until the data is written from the field memory (d) at the next time.

Similarly, the field memories (b) and (e) also write only the image data 1260, 1262, and 1290, 1292 just before the field numbers change out of the image data to the respective field memories of the subsequent stages. Moreover, the field memories (e) and (c) also hold the image data thus written thereto until the data is written at the next time.

The image data just before the field numbers change out of the image data of the field memory may be written to the field memory of the subsequent stage in the timing of the input image data 1251 and 1255 just after the field numbers change.

Now, through the output terminal 912 of FIG. 21, the data stored in the field memory (b) is outputted. Similarly, the data stored in the field memory of the fourth stage is outputted through the output terminal 913.

By performing the above processings, immediately after the field numbers of the input image data of FIG. 22B change, the image data of the different fields can be arranged in the field memories in order of input, and the image data of the proper difference between two fields and the image data of the proper difference between two frames can be obtained.

However, in the case of the input image data, other than the input image data just after the field numbers change, out of the input image data of (a) of FIG. 22B, the image data which is prior to the image data of the present field by one frame and the image data which is prior thereto by two frames are not obtained on the basis of the field memories (b) and (c). Therefore, it is impossible to perform the proper motion detection. Then, by the processing as will be described later, the motion quantity just after the field number changes is set as the motion quantity until the field number changes at the next time.

Incidentally, in the case of the image data of the non-interlace system in which the image data inputted through the regenerative image terminal 901 is not the signal, with which the scanning lines are interlaced with each other every field, but the same positions are interlaced in the fields, the motion detection may be performed even with the image data of a difference between one field and a directly following field and the image data of a difference between one field and the next but two fields. Even in this case, however, during the special playback, the same operation as in the above-mentioned memory delay processing is required.

The image data of the present field which has been outputted through the output terminal 911 is inputted to the edge detection circuit 920, and the subtracters 942 and 943. Moreover, the image data which has been outputted through the output terminal 912 to be delayed by one frame is inputted to the subtracter 942 which subjects that image data and the image data of the present field outputted through the output terminal 911 to the subtraction processing to detect the motion signal of the difference between two fields.

Similarly, the image data which has been outputted through the output terminal 913 to be delayed by two frames is inputted to the subtracter 943 which subjects that image data and the image data of the present field outputted through the output terminal 911 to the subtraction processing to detect the motion signal of the difference between two frames. But, in the case where the image data inputted to the regenerative image data input terminal 901 is the composite signal in which the chrominance signal and the luminance signal are superposed on each other in the NTSC system, as shown in FIG. 3B, the phase of the subcarrier for carrying the color signal is inverted every frame. Therefore, the motion signal of the difference between two fields includes the difference between the wrong color signal components. Then, the output of the subtracter 914 is inputted to LPF 941 to remove the component of the color signal.

In the case where the image data inputted to the regenerative image data input terminal 901 is the non-multiple image data such as a component signal, LPF 941 becomes unnecessary.

Moreover, with the image data of the present field which has been outputted through the output terminal 911 to be inputted to the edge detection circuit 920, the edge part of the picture image of the image data is detected by the edge detection circuit 920 which outputs the resultant edge information. The motion signal of the difference between two fields and the motion signal of the difference between two frames which have been outputted from LPF 941 and the subtracter 943 are subjected to the absolute value processings in the absolute value circuits 944 and 945 and inputted to the motion signal conversion circuits 946 and 947, respectively.

The motion signal conversion circuits 946 and 947 convert respectively the input motion signal of the difference between two fields and the input motion signal of the difference between two frames in accordance with the edge information detected by the edge detection circuit 920. That is, in the case where the motion detection of the image data is performed, the edge part of the picture image may be detected as the motion by mistake in many cases. Then, with respect to the position which is judged to be the edge part by the edge detection circuit 120, the sensitivity of detecting the motion to the edge part is decreased in accordance with the sharpness of the edge detected. By the conversion processings in the motion signal conversion circuits 946 and 947, the bad influence when the edge part of the picture image of the image data is detected as the motion by mistake is reduced.

Both the motion signal of the difference between two fields and the motion signal of the difference between two frames which have been subjected to the level conversion processing in the motion signal conversion circuits 946 and 947 are inputted to the composition circuit 948 to be composed with each other while being weighted using respective arbitrary coefficients. In the present embodiment, the output of the motion signal conversion circuit 946 and the output of the motion signal conversion circuit 947 are composed with each other using the addition mean processing method in which those outputs are added to each other in the proportion 1:1. The composite motion signal outputted from the composition circuit 948 is inputted to the noise removing circuit 949.

Next, the noise removing circuit 949 will hereinbelow be described.

Figure 23:
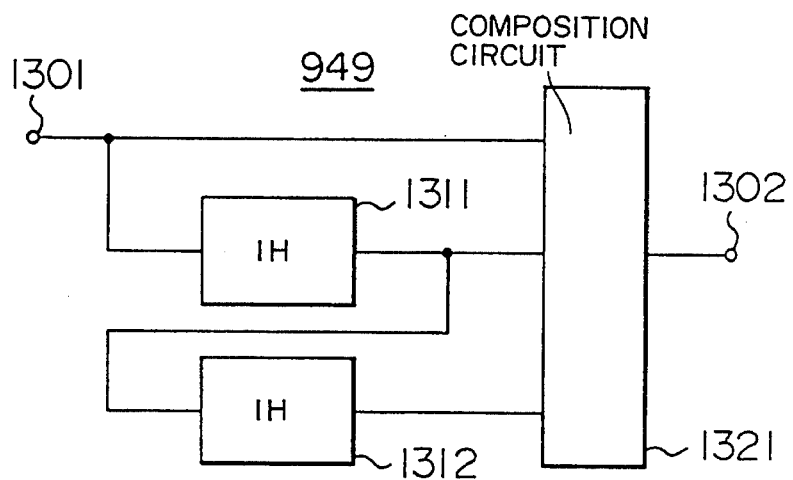
FIG. 23 is a block diagram showing a configuration of a noise removing circuit of FIG. 21.

FIG. 23 shows a configuration of the noise removing circuit 949.

In FIG. 23, the reference numeral 1301 designates an output terminal through which the motion signal outputted from the composition circuit 948 of FIG. 21 is inputted; the reference numeral 1302 designates an output terminal through which the motion signal after removing the influence of the noise and the like is outputted; the reference numerals 1311 and 1312 designate delay circuits of 1 H; and the reference numeral 1321, a composition circuit. In the noise removing circuit, the motion signal which has been inputted through the input terminal 1301 is, together with the signal which has been obtained by delaying that signal through the delay circuit 1311 by 1 H and the signal which has been obtained by further delaying that signal through the delay circuit 1312 by 1 H, inputted to the composition circuit 1321.

The composition circuit 1321 selects one of the three motion signals thus inputted, or adds those signals one another while weighting them using respective arbitrary coefficient values. That is, by that processing, the vertical correlation of the motion signals thus detected is checked to remove the component which is remarkably deviated as compared with the vertical motion signals as the noise and the like. This processing utilizes that the image data reproduced is formed in the form of the waveform which is continuous in the direction of the scanning line, i.e., in the horizontal direction on the picture plane, and when the noise and the like are superinposed on the image data waveform, the influence of the noise and the like spreads in the horizontal direction on the picture plane and that influence does not spread in the vertical direction on the picture plane. By performing such a processing, it is possible to reduce the influence of the noise and the like. The output signal of the composition circuit 1321 is inputted as the motion signal after removing the noise and the like from the output terminal 1302 to the gate circuit 325 of which output is, together with the output of the coefficient multiplier 972, inputted to the composition circuit 973.

In FIG. 21, the motion composition circuit 973 outputs the motion signal which has been obtained by the composition of the output of the noise removing circuit 949 and the output of the coefficient multiplier 972 in the case where the play is not the slow motion playback, i.e., in the case where the field number changes sequentially, in accordance with the field jump information outputted from the field jump detection circuit 930. On the other hand, the motion composition circuit 973 outputs directly the output of the coefficient multiplier 972 in the case of the slow motion playback, i.e., in the case where the same field number continues. In the present embodiment, in the case where the play is not the slow motion playback, the larger one of the output of the noise removing circuit 949 and the output of the coefficient multiplier 972 is selected, or those outputs are composed with each other in a predetermined ratio.

To the composition circuit 955 are inputted the motion signal which has been obtained by subjecting the motion signal outputted from the motion composition circuit 973 to the damping processing in the coefficient multiplier 953, the motion signal which has been obtained by delaying the motion signal outputted from the motion composition circuit 973 through the delay circuit 951 by one clock using the clock having a frequency four times as large as that of the color subcarrier, and the motion signal which has been obtained in such a way that after the motion signal outputted from the motion composition circuit 973 is delayed through the delay circuits 951 and 952 by two clocks using the clock having a frequency four times as large as that of the color subcarrier, the resultant signal is subjected to the damping processing in the coefficient multiplier 954. But, in the present embodiment, it is assumed that the image data which is obtained by sampling the analog video signal at a frequency four times as large as that of the color subcarrier is used for the record.

In the composition circuit, in accordance with the field jump information outputted from the field jump detection circuit 930, the output of the delay circuit 951 is directly outputted in the case of the slow motion playback. Moreover, in the case where the play is not the slow motion playback, the three motion signals are composed with one another to be outputted. In the present embodiment, as the composition processing in the case where the play is not the slow motion playback, the maximum one of the three motion signals is selected to be outputted. In the case where the play is not the slow motion playback, the delay circuits 951 and 952, the coefficient multipliers 953 and 954, and the composition circuit 955 operate as the horizontal filter which performs the processing of expanding the motion detected in the horizontal direction while damping that motion.

The motion signal which has been outputted from the composition circuit 955 is, together with the motion signal which has been outputted through the output terminal 904 to control the Y/C separator 25 and also has been delayed through the delay circuit 961 by 1 H, inputted to the composition circuit 962. In the composition circuit 962, in accordance with the field jump information outputted from the field jump detection circuit 930, the output of the composition circuit 955 and the output of the delay circuit 961 are alternately outputted every field in the case of the slow motion playback. On the other hand, in the case where the play is not the slow motion playback, the two motion signals are subjected to the composition processing to be outputted. That is, the processing of expanding the motion of the video signal in the vertical direction on the picture plane is performed. In the present embodiment, as the composition processing in the case where the play is not the slow motion playback, the maximum one of the two motion signals is selected to be outputted.

The motion signal which has been outputted from the composition circuit 962 is outputted through the output terminal 905 to be used to control the line-interpolation circuit 26 and also inputted to the delay circuit 971.

On the other hand, the input motion signal is subjected to the delay processing in such a way that the output of the coefficient multiplier 917 is delayed by one field with respect to the output of the noise removing circuit 949, thereby to be inputted to the coefficient multiplier 972. With the motion signal inputted to the coefficient multiplier 972, in accordance with the field jump information outputted from the field jump detection circuit 930, the input motion signal is directly outputted in the case of the slow motion playback, while in the case where the play is not the slow motion playback, that input motion signal is subjected to the damping processing using the arbitrary coefficient value to be outputted. The motion signal outputted from the coefficient multiplier 972 is, as described above, inputted to the motion composition circuit 973.

As described above, in the present embodiment, in accordance with the field jump information outputted from the field jump detection circuit 930, in the case where the play is the same slow motion playback, the motion composition circuit 973, the composition circuits 955 and 962, and the coefficient multiplier 972 are controlled, and the delay circuits 951, 961 and 971 perform the function of the field memory for storing the motion signal of one field. The output of the field memory which is made up of the delay circuits 951, 961 and 971 is directly fed back to the motion composition circuit 973.

That is, in the case of the slow motion playback as shown in FIG. 22B for example, with respect to the image data 1251 just after the field number changes, the proper motion detection is performed, the motion signal detected is spatially expanded through the filter made up of the delay circuits 951 and 952, and the coefficient multipliers 953 and 954, and the filter made up of the delay circuit 961 and the composition circuit 962 to be outputted, and also the motion signal detected is stored in the field memory made up of the delay circuits 951, 961 and 971.

For the image data, by which the proper motion detection cannot be performed, other than the image data just after the field number changes, the image data just after the field number changes is obtained, and the motion signal which is stored in the field memory made up of the delay circuits 951, 961 and 971 is repeatedly used.

Therefore, the proper motion detection result can be always obtained, and the false control of the Y/C separator 25 and the line-interpolation circuit 26 can be prevented.

Moreover, as in the present embodiment, the circuit is constructed in such a way as to damp the detected motion signal even in the normal direction playback to feed back the resultant signal, whereby the detected motion signal can be expanded by several fields in the horizontal and vertical directions and further in the time base direction in correspondence to the coefficient value of the coefficient multiplier 972. As a result, the present embodiment is effective to prevent the omission of the motion in the image data or the like in which the picture image changes with a period of two fields. If the more field memories are used in the present embodiment, it is possible to detect the motion among n frames (n: positive integral number).

The motion detection circuit according to the present embodiment can be similarly applied to other image storage/reproduction apparatuses such as an optical disc device and a magneto-optic disc device as well as a digital VTR and an analog VTR which are of other systems. Moreover, the motion detection circuit according to the present embodiment can be similarly applied to the image signals of other systems such as PAL and SECAM as well as the NTSC signal.

We claim:

1. A method of converting a field of a regenerative signal in a VTR, comprising the steps of:

delaying video signals which have been inputted in sequence to produce a plurality of delayed video signals which are delayed by about integral multiples of one field;

outputting a motion signal for representing a degree of the motion by obtaining motion among n frames (n: positive integral number) on the basis of video signals of a first field which are being inputted at present and said delayed video signals which are prior to said first field by the n frames, storing data relating to said motion in a motion memory of one field, outputting said data relating to said motion stored in said motion memory as said motion signal of said video signals of said first field when said video signals of said first field are obtained by repetition of a field just before said first field, and when said video signals of said first field are not obtained by the repetition of the field just before said first field, performing a filtering processing in a time direction by multiplying said data relating to said motion stored in said motion memory by predetermined coefficients and performing a feed back processing on said multiplied data, composing said data after said filtering processing and said data relating to said motion stored in said motion memory at a predetermined ratio, and outputting said composed data as said motion signal of said video signals of said first field;

separating a video signal of said first field into a luminance signal and a carrier chrominance signal;

separating a video signal of a second field which is to be interlaced with said first field into a luminance signal and a carrier chrominance signal;

performing an inter-field signal processing to form field data of a predetermined field number by using said luminance signals and said carrier chrominance signals of said first and second fields, wherein when said video signals which have been inputted in a normal direction are processed, a phase of said carrier chrominance signal of said second field is inverted, and when said video signals which have been inputted in a reverse direction are processed, the phase of said carrier chrominance signal of said second field is not inverted;

performing an inter-line signal processing to form field data of a predetermined field number by using said luminance signal and said carrier chrominance signal of said first field; and outputting field data, wherein when said motion signal represents a still part, said outputted field data is produced by outputting said field data obtained by said inter-field signal processing, when said motion signal represents a moving part, said outputted field data is produced by outputting said field data obtained by said inter-line signal processing, and when an abnormal state of said inputted video signals is detected, said outputted field data is produced by outputting said field data obtained by said inter-line signal processing is outputted at least until said abnormal state is no longer detected and video signals required to perform the inter-field signal processing have been inputted, wherein said abnormal state includes any state which does not occur during any normal playback mode.

2. A method according to claim 1, wherein said step of outputting field data includes the step of detecting as said abnormal state (1) a state in which said inputted video signals are not inputted in a normal order for a current playback mode, or (2) an occurrence of a switching from one playback mode to another playback mode.

3. A method of detecting motion of video signals, comprising the steps of:

delaying video signals which have been inputted in sequence to produce a plurality of delayed video signals which are delayed by about integral multiples of one field, wherein when video signals of a present field which are being inputted at present are not obtained by repetition of a field just before said present field, the delayed video signals of the field just before said present field are delayed by integral multiples of one field and stored in a memory; and outputting a motion signal for representing a degree of the motion by obtaining motion among n frames (n: positive integral number) on the basis of said video signals of said present field and said delayed video signals which are prior to said present field by the n frames, storing data relating to said motion in a motion memory of one field, outputting said data relating to said motion stored in said motion memory as said motion signal of said video signals of said present field when said video signals of said present field are obtained by repetition of the field just before said present field, and when said video signals of said present field are not obtained by the repetition of the field just before said present field, performing a filtering processing in a time direction by multiplying said data relating to said motion stored in said motion memory by predetermined coefficients and performing a feed back processing on said multiplied data, composing said data after said filtering processing and said data relating to said motion stored in said motion memory at a predetermined ratio, and outputting said composed data as said motion signal of said video signals of said present field.

4. An apparatus for converting a field of a regenerative signal in a VTR, comprising:

means for delaying video signals which have been inputted in sequence to produce a plurality of delayed video signals which are delayed by about integral multiples of one field;

means for obtaining motion among n frames (n: positive integral number) on the basis of video signals of a first field which are being inputted at present and said delayed video signals which are prior to said first field by the n frames;

memory means for storing data relating to said motion;

means for outputting said data relating to said motion stored in said memory means as a motion signal of said video signals of said first field when said video signals of said first field are obtained by repetition of a field just before said first field;

means for performing a filtering processing in a time direction by multiplying said data relating to said motion stored in said memory means by predetermined coefficients and performing a feed back processing on said multiplied data, when said video signals of said first field are not obtained by the repetition of the field just before said first field;

means for composing said data after said filtering processing and said data relating to said motion stored in said memory means at a predetermined ratio, and for outputting said composed data as a motion signal of said video signals of said first field, when said video signals of said first field are not obtained by the repetition of the field just before said first field;

means for separating a video signal of said first field into a luminance signal and a carrier chrominance signal;

means for separating a video signal of a second field which is to be interlaced with said first field into a luminance signal and a carrier chrominance signal;

means for performing an inter-field signal processing to form field data of a predetermined field number by using said luminance signals and said carrier chrominance signals of said first and second fields, wherein when said video signals which have been inputted in a normal direction are processed, a phase of said carrier chrominance signal of said second field is inverted, and when said video signals which have been inputted in a reverse direction are processed, the phase of said carrier chrominance signal of said second field is not inverted;

means for performing an inter-line signal processing to form field data of a predetermined field number by using said luminance signal and said carrier chrominance signal of said first field; and means for outputting field data, wherein when said motion signal represents a still part, said outputted field data is produced by outputting said field data obtained by said inter-field signal processing, when said motion signal represents a moving part, said outputted field data is produced by outputting said field data obtained by said inter-line signal processing, and when an abnormal state of said inputted video signals is detected, said outputted field data is produced by outputting said field data obtained by said inter-line signal processing at least until said abnormal state is no longer detected and video signals required to perform the inter-field signal processing have been inputted, wherein said abnormal state includes any state which does not occur during any normal playback mode.

5. An apparatus according to claim 4, wherein said means for outputting field data includes means for detecting as said abnormal state (1) a state in which said inputted video signals are not inputted in a normal order for a current playback mode, or (2) an occurrence of a switching from one playback mode to another playback mode.

6. An apparatus for detecting motion of video signals, comprising:

means for delaying video signals which have been inputted in sequence to produce a plurality of delayed video signals which are delayed by about integral multiples of one field, wherein when video signals of a present field which are being inputted at present are not obtained by repetition of a field just before said present field, the delayed video signals of the field just before said present field are delayed by integral multiples of one field;

a first memory for storing said delayed video signals;

means for obtaining motion among n frames (n: positive integral number) on the basis of said video signals of said present field and said delayed video signals which are prior to said present field by the n frames;

a second memory for storing data relating to said motion;

means for outputting said data relating to said motion stored in said second memory as a motion signal of said video signals of said present field when said video signals of said present field are obtained by repetition of the field just before said present field;

means for performing a filtering processing in a time direction by multiplying said data stored in said second memory by predetermined coefficients and performing a feed back processing on said multiplied data, when said video signals of said present field are not obtained by the repetition of the field just before said present field; and means for composing said data after said filtering processing and said data relating to said motion stored in said second memory at a predetermined ratio, and for outputting said composed data as a motion signal of said video signals of said present field, when said video signals of said present field are not obtained by the repetition of the field just before said present field.

* * * * *